US008260014B2

(12) United States Patent
Chen et al.

(10) Patent No.: US 8,260,014 B2
(45) Date of Patent: Sep. 4, 2012

(54) MICROCALCIFICATION DETECTION IN MAMMOGRAPHY CAD USING A CLASSIFIER

(75) Inventors: Shoupu Chen, Rochester, NY (US); Yong Chu, Rochester, NY (US)

(73) Assignee: Carestream Health, Inc., Rochester, NY (US)

( * ) Notice: Subject to any disclaimer, the term of this patent is extended or adjusted under 35 U.S.C. 154(b) by 1117 days.

(21) Appl. No.: 12/102,144

(22) Filed: Apr. 14, 2008

(65) Prior Publication Data

US 2009/0180674 A1    Jul. 16, 2009

Related U.S. Application Data

(60) Provisional application No. 61/021,389, filed on Jan. 16, 2008.

(51) Int. Cl.
   *G06K 9/00* (2006.01)
(52) U.S. Cl. ....................................................... 382/128
(58) Field of Classification Search ........................ None
   See application file for complete search history.

(56) References Cited

U.S. PATENT DOCUMENTS

| | | | | |
|---|---|---|---|---|
| 6,389,157 | B2 * | 5/2002 | Rogers et al. | 382/132 |
| 6,801,645 | B1 * | 10/2004 | Collins et al. | 382/130 |
| 7,593,561 | B2 * | 9/2009 | Zhang et al. | 382/130 |
| 7,848,555 | B2 * | 12/2010 | Zhang et al. | 382/130 |
| 7,899,228 | B2 * | 3/2011 | Chen et al. | 382/128 |
| 8,164,039 | B2 * | 4/2012 | Bovik et al. | 250/208.1 |
| 2002/0159622 | A1 | 10/2002 | Schneider et al. | |
| 2006/0147101 | A1 * | 7/2006 | Zhang et al. | 382/131 |
| 2009/0041326 | A1 * | 2/2009 | Chen et al. | 382/132 |
| 2009/0041327 | A1 * | 2/2009 | Chen et al. | 382/132 |
| 2010/0021036 | A1 * | 1/2010 | Chen et al. | 382/132 |
| 2010/0104155 | A1 * | 4/2010 | Chen et al. | 382/128 |
| 2010/0246884 | A1 * | 9/2010 | Chen et al. | 382/103 |
| 2011/0142323 | A1 * | 6/2011 | Chen et al. | 382/132 |

OTHER PUBLICATIONS

Chen et al., "Linear Structure Verification in Medical Applications," U.S. Appl. No. 60/954,153, filed Aug. 6, 2007.
Chen et al., "Line Structure Detection and Analysis for Mammography CAD," U.S. Appl. No. 11/834,243, filed Aug. 6, 2007.
Wai et al., "A Multi resolution CLS Detection Algorithm for Mammographic Image Analysis," Medical Imaging Computing and Computer Assisted Intervention, MICCAU, pp. 865-872, 2004.
N. Cerneaz and M. Brady, "Finding Curvilinear Structures in Mammograms," Lecture Notes in Computer Science, 905, pp. 372-382, 1995.
Zhang et al., "A New False Positive Reduction Method for MCCs Detection in Digital Mammography," Accoustics, Speech and Signal Processing 2001, Proc. IEEE Intl. Conf. on (ICASSP), V. 2, Issue 2001, p. 1033-1036.
R. Zwiggelaar, T. C. Parr, and C. J. Taylor, "Finding orientated line patterns in digital mammographic images," Proc. 7th Br. Machine Vision Conf., 1996, pp. 715-724.

* cited by examiner

*Primary Examiner* — Jermele M Hollington

(57) ABSTRACT

A system is disclosed that is configured for microcalcifications (mcc) detecting by forming a plurality of true mcc clusters and a plurality of normal clusters, gathering spot and cluster features from said clusters, extracting linear structure features, and using said spot, cluster and linear structure features in mcc detector algorithm training.

17 Claims, 18 Drawing Sheets

MICROCALCIFICATION DETECTION IN MAMMOGRAPHY CAD USING A CLASSIFIER

CROSS-REFERENCE TO RELATED APPLICATIONS

Reference is made to, and priority is claimed from, Provisional Application Ser. No. 61/021,389, filed 16 Jan. 2008.

FIELD OF THE INVENTION

The invention relates generally to image processing in mammography, and in particular, to microcalcification detection using a classifier.

BACKGROUND OF THE INVENTION

It is recognized that mammography is a common method of breast cancer screening. However, analyzing mammograms requires skilled radiologists whose performance can be degraded by the demand of viewing a large number of images in a finite amount of time. Since late 90s the computer-aided detection (CAD) in mammography has been provided to the radiologists in a hope that the mammography CAD system will help the radiologists to capture true-positives (TP) that might otherwise have been overlooked.

A sizable percentage of abnormality in mammograms involves microcalcifications (mcc), i.e., tiny deposits of calcium in breast carcinoma. It is very difficult to distinguish between malignant and benign microcalcification clusters, even for experienced radiologists, which may lead to a high rate of unnecessary biopsies. (Note that an mcc cluster comprises a plurality of mcc spots each of which, in turn, comprises a plurality of mammographic image pixels.)

Therefore, it is beneficial to design the CAD algorithm in such a way that a high TP rate can be achieved while the number of false-positives (FPs) is kept to a minimum. It is discovered that some FP mcc candidates as selected by mammography CAD systems were found to fall on the linear normal structures, such as blood vessels in digital or film-based mammograms. Removing those mcc candidates that are associated with linear structures will reduce the overall FP rate. Practically, there are variations in appearance of linear structures in terms of contrast, brightness, texture and morphological shapes, among others.

Various methods for extracting linear structures have been proposed in the past. Zwiggelaar, Parr, and Taylor (R. Zwiggelaar, T. C. Parr, and C. J. Taylor, "Finding orientated line patterns in digital mammographic images," *Proc. 7th Br. Machine Vision Conf.,* 1996, pp. 715-724) have compared the performance of several different approaches (including orientated bin and line operator methods) to the detection of linear structures with synthetic mammographic images. Their results suggest differences between the different approaches. One approach has been implemented as a multi-scale line operator.

The work of a line operator can be described as followings. The line operator takes the average grey level of the pixels lying on an orientated local line passing through the target pixel and subtracts the average intensity of all the pixels in the locally orientated neighborhood. The line strength is compared for n orientations. Line direction is obtained from the orientation producing the maximum line strength. Scale information can be obtained by applying the line operator to images that are rescaled by Gaussian smoothing and sub-sampling. For each pixel, the scale producing the maximum line strength is taken as the detected line scale.

Cerneaz et al. (N. Cerneaz and M. Brady, "Finding Curvilinear Structures in Mammograms," *Lecture Notes in Computer Science,* 905, pp. 372-382, 1995) introduce a method that estimates the intensity profile of the curvilinear structures (CLS) in mammograms in a single scale. In this method, the CLS are assumed to have circular cross section when the breast is not compressed. And the cross section of CLS in mammogram is assumed to be elliptical. Candidate pixels for CLS are detected using the response of a second order difference operation which is applied in four directions. If there is a sufficient high response for one of the orientations the pixel will form part of a CLS. A measure of line strength is obtained by determining the contrast of the line profile at these pixels. Wai et al. (A Multi-resolution CLS Detection Algorithm for Mammographic Image Analysis," *Medical Imaging Computing and Computer-Assisted Intervention, MICCAU,* pp. 865-872, 2004) adopt the two step method from Cemeaz's work and devise a multi-resolution ridge detector for structures ranging from 1800 microns to 180 microns. Wai et al. also enhance the performance of the detector by using a local energy thresholding to suppress undesirable response from noise. The local energy is also used to determine CLS junctions.

Alexander Schneider et al. (U.S. Patent Application Publication No. US20020159622(A1)) propose a system and method for detecting lines in medical images. In their method, a direction image array and a line image array are formed by filtering a digital image with a single-peaked filter, convolving the regular array with second-order difference operators oriented along the horizontal, vertical, and diagonal axes, and computing the direction image arrays and line image arrays as direct scalar functions of the results of the second order difference operations. They have found that line detection based on the use of four line operator functions requires fewer computations than line detection based on the use of three line operator functions, if the four line operator functions correspond to the special orientations of 0, 45, 90 and 135 degrees.

For the issue of FP reduction, a paper by Zhang et al. ("A New False Positive Reduction Method for MCCs Detection in Digital Mammography," *Accoustics, Speech and Signal Processing* 2001, *Proc. IEEE Intl. Conf. on* (ICASSP), V. 2, Issue 2001, pp. 1033-1036, 2001) describes a mixed feature multistage FP reduction algorithm utilizing eleven features extracted from spatial and morphology domains. These features include gray-level description, shape description and clusters description but no feature is directly related to linear structures. Wai et al. mention in their article that the results from the multi-resolution ridge detector could be beneficial to microcalcification false-positive reduction but the realization of the reduction is absent. Moreover, it is computationally inefficient to generate actual linear structures just for the purpose of confirming the association of an mcc candidate cluster with a linear structure in mammography CAD. (Note that an mcc candidate cluster is a cluster that is under testing for cancerous lesions. A cluster comprises a plurality of spots. A spot comprises a plurality of image pixels.)

Therefore, an improved general approach of microcalcification detection in mammography CAD is needed.

SUMMARY OF THE INVENTION

The present invention is directed to overcoming one or more of the problems set forth above. Briefly summarized, according to one aspect of embodiments of the present invention, the invention resides in a method of microcalcification detection in mammographic images. This method includes the steps of forming a plurality of true (i.e. malignant) mcc clusters from a plurality of cancerous mammographic images that pass an mcc ground truth measure test; forming a plurality of normal (i.e. non-cancerous) clusters from a plurality of normal mammographic images; gathering spot and cluster features from said true mcc clusters and normal clusters; extracting linear structure features in said cancerous mammographic images and normal mammographic images guided by said true mcc clusters and said normal clusters; using said gathered spot and cluster features and said extracted linear structure features in mcc detector training; and applying said mcc detector to mammographic test images which are under testing for cancerous lesions.

According to another aspect of embodiments of the present invention, the invention resides in a method of microcalcification detection with cluster reduction in mammographic images. This method includes the steps of forming a plurality of true mcc clusters from a plurality of cancerous mammographic images that pass an mcc ground truth measure test; forming a plurality of normal clusters from a plurality of normal mammographic images; gathering spot and cluster features from said true mcc clusters and normal clusters; extracting linear structure features in said cancerous mammographic images and normal mammographic images guided by said true mcc clusters and said normal clusters; generating cluster reduction rules from distributions of said linear structure features; using said spot and cluster features, said linear structure features and said cluster reduction rules in mcc detector training; and applying said mcc detector and said cluster reduction rules to mammographic test images which are under testing for cancerous lesions.

According to still another aspect of embodiments of the present invention, the invention resides in a method of microcalcification detection incorporating linear structure features in mammographic images. This method includes the steps of forming a plurality of true mcc clusters from a plurality of cancerous mammographic images; forming a plurality of normal clusters from a plurality of normal mammographic images; gathering spot and cluster features from said true mcc clusters and normal clusters; extracting linear structure features in said cancerous mammographic images and normal mammographic images guided by said true mcc clusters and said normal clusters; using said gathered spot and cluster features and said extracted linear structure features in mcc detector training; and applying said mcc detector to mammographic test images which are under testing for cancerous lesions.

These and other aspects, objects, features and advantages of the embodiments of the present invention will be more clearly understood and appreciated from a review of the following detailed description of the preferred embodiments and appended claims, and by reference to the accompanying drawings.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

DETAILED DESCRIPTION OF THE INVENTION

Figure 1:
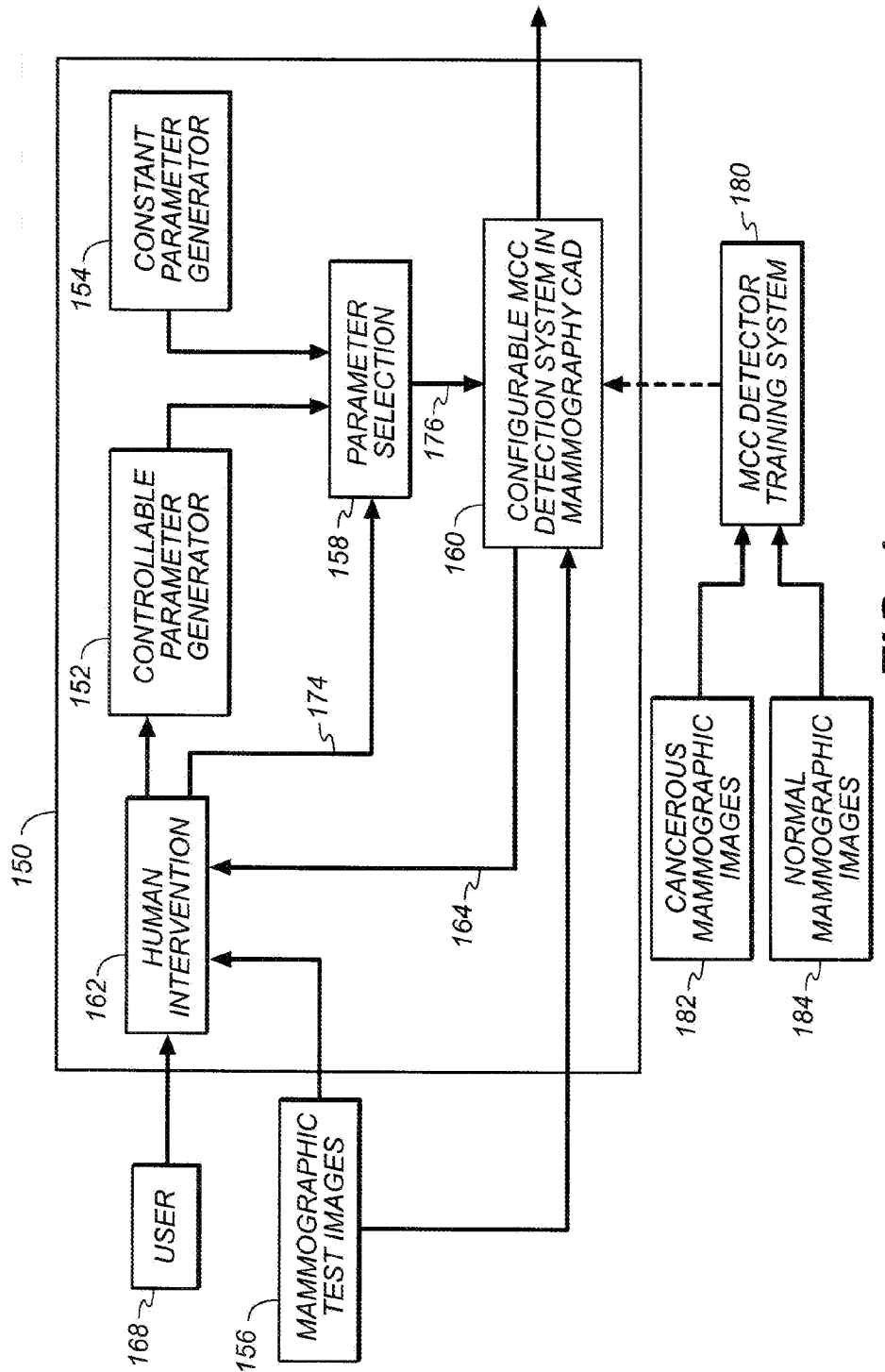
FIG. 1 is an illustration of an embodiment of the method for microcalcification detection for the current invention.

Reference is made to U.S. provisional application entitled LINEAR STRUCTURE VERIFICATION IN MEDICAL APPLICATIONS having U.S. Ser. No. 60/954,153 by Chen, filed Aug. 6, 2007, and U.S. application entitled LINE STRUCTURE DETECTION AND ANALYSIS FOR MAMMOGRAPHY CAD having U.S. Ser. No. 11/834,243 by Chen, now U.S. Pat. No. 7,899,228, filed Aug. 6, 2007, both of which are incorporated by reference herein.

The following is a detailed description of the preferred embodiments of the invention, reference being made to the drawings in which the same reference numerals identify the same elements of structure in each of the several figures.

In the embodiment of the method of microcalcification detection, described previously in the Summary of the Invention, the cancerous mammographic images contain mass and microcalcification lesions that are confirmed by radiologists. The normal mammographic images do not contain mass or microcalcification lesions. A spot comprises a plurality of image pixels. A cluster comprises a plurality of spots. An mcc detector detects microcalcification lesions in mammographic images. A mammographic test image is an image under testing for cancerous lesions. The mammographic test image may or may not contain mass or microcalcification (or both) lesions.

Turning now to FIG. 1, the method of the present invention will be outlined. FIG. 1 is a flow chart 150 illustrating an embodiment of the method of microcalcification detection for the present invention.

As stated in the background of the invention there are practically unlimited variations in appearance of linear structures in terms of contrast, brightness, texture and morphological shapes, among others.

Therefore, it is more desirable, as one measure, to synergistically integrate human user and computer in the process of microcalcification detection for a practical image processing system. It is well known that a human excels in creativity, use of heuristics, flexibility and common sense; while a computer excels in speed of computation, strength and perseverance. This synergy of human and computer can be realized by incorporating a detection parameter control into the process. In FIG. 1, there is provided a step of parameter selection 158 letting the human user 168 participate in the process loop. The parameter selection 158 selects a set of parameters either from a constant parameter generator 154 or from a controllable parameter generator 152. The parameter selection 158 sends the selected parameters to step 160 through path 176. The controllable parameter generator 152 is manipulated by a human operator 168 through a step of human intervention 162. The human operator 168 receives input information 156 or feedback 164 from the detection output and makes a decision to use parameters either from the constant parameter generator 154 or from the controllable parameter generator 152.

The method provided by the present invention for building a practical mcc detection system provides an integrated solution to the mcc detection problem by constructing a configurable detection system. This configurable system can be configured or reconfigured by commands from the human operator 168 through a command line 174.

Figure 2A:
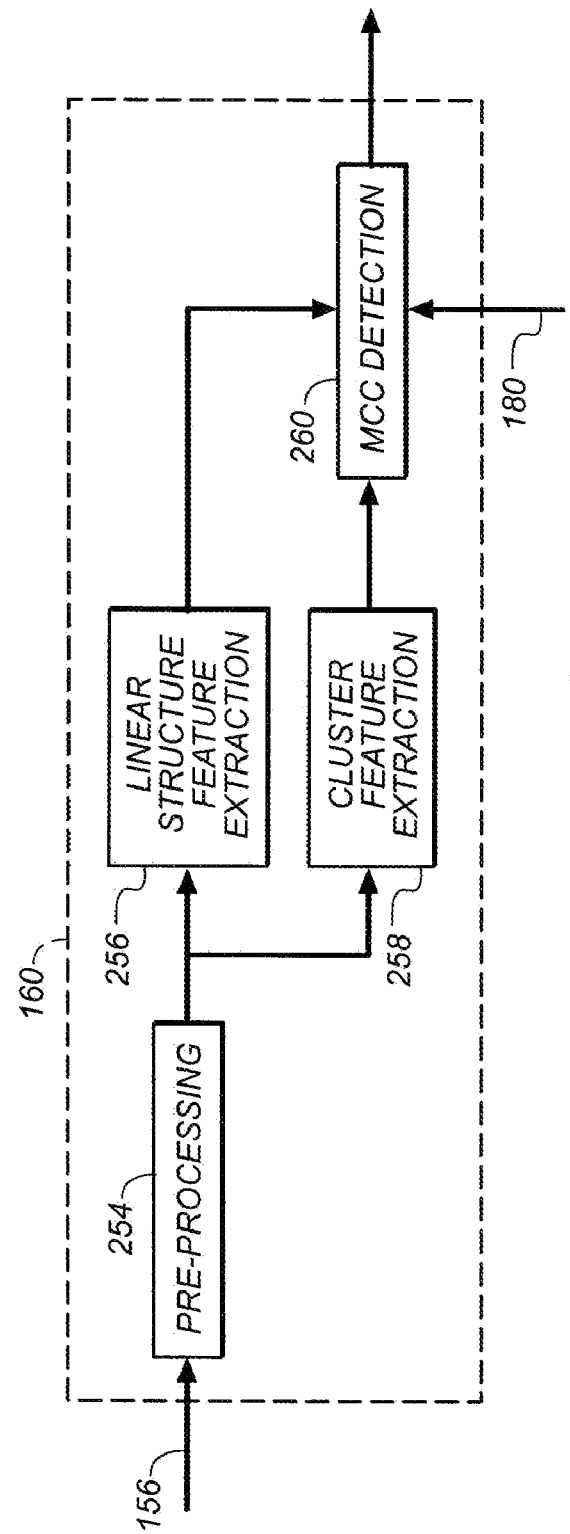
FIGS. 2(A) and 2(B) illustrate exemplary workflows for mcc detection for the current invention.
Figure 2B:
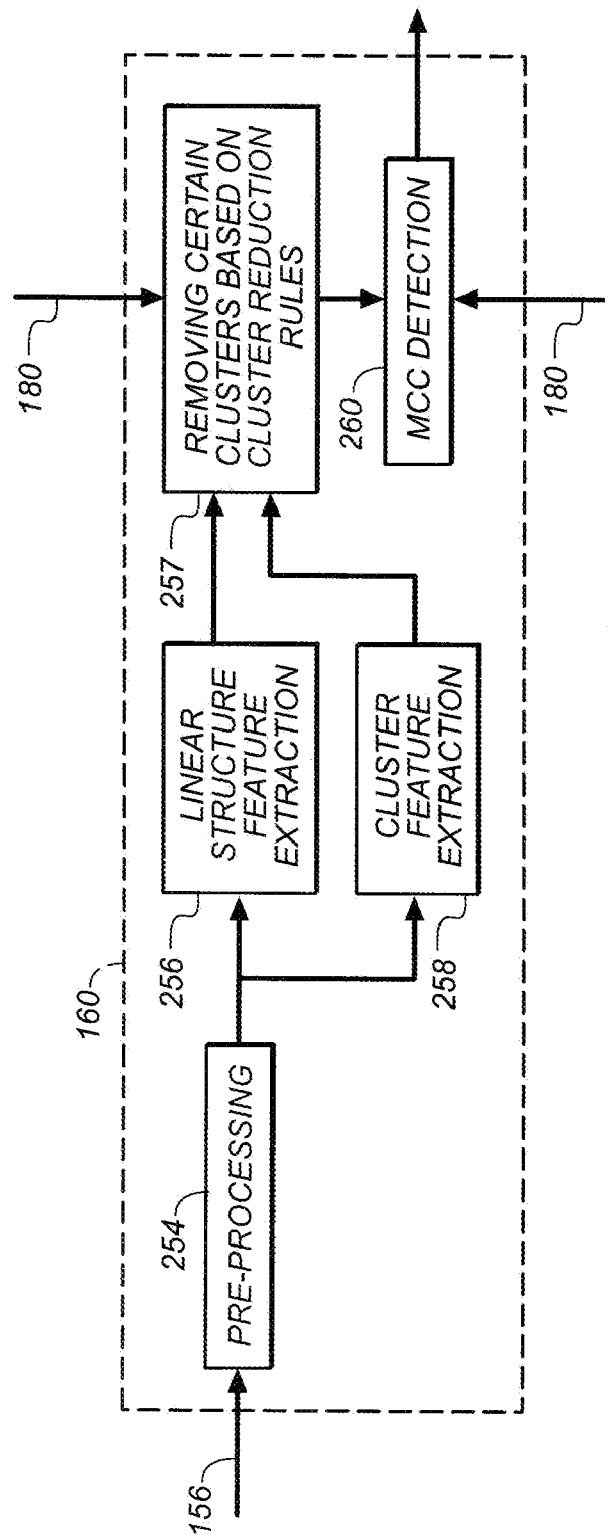

In general, the configurable detection system can be configured differently in a workflow (or equivalently, forming different workflows). Exemplary workflows of configurable mcc detection system 160 are depicted in FIGS. 2(A) and 2(B). In FIG. 2(A), mammographic test images 156 are first processed in Pre-processing step 254 which applies various image processing algorithms such as filtering, morphological processing, spot feature extraction, etc. to the incoming images to form microcalcification candidate clusters. Again, a microcalcification candidate cluster is thus a portion of a said mammographic test image and is under testing for cancerous lesions.

Note that exemplary spot features may include the followings:
Density features: this is characterized by statistics of gray levels, such as mean, min, max of pixels on a spot.
Boundary or margin features: this is characterized by gradient calculated on the spot boundary.
Morphological features: about shape, size, etc.
Texture analysis: here basically uses the statistical approach to characterize the stochastic properties of the spatial distribution of gray levels in an image. Specifically, the entropy and homogeneity are calculated.
Others.

For a first exemplary workflow of microcalcification detection shown in FIG. 2(A), the microcalcification candidate clusters enter the step of Linear structure feature extraction 256 and the step of Cluster feature extraction followed by the step of Mcc detection 260 that classifies microcalcification candidate clusters into malignant or benign types. Certain mcc detection parameters are supplied by the step of Mcc detector training system 180 which is to be discussed shortly. Cluster feature extraction is also to be discussed in the step of Mcc detector training system 180. Linear structure feature extraction is to be explained in depth in the later discussions of "Features of Ensemble Average of Lines in Gradient Magnitude Space", "Features in Hough Transformation Domain", and "Additional Measure for TP Protection".

For a second exemplary workflow of microcalcification detection shown in FIG. 2(B), the microcalcification candidate clusters enter the step of Linear structure extraction 256 and the step of Cluster feature extraction 258 followed by the step of Removing certain clusters based on cluster reduction rules 257. The remaining mcc candidate clusters after step 257 enter the step of Mcc detection 260 that classifies microcalcification clusters into malignant or benign types. Candidate cluster removing rules and certain mcc detection parameters are supplied by the step of Mcc detector training system 180.

Figure 3A:
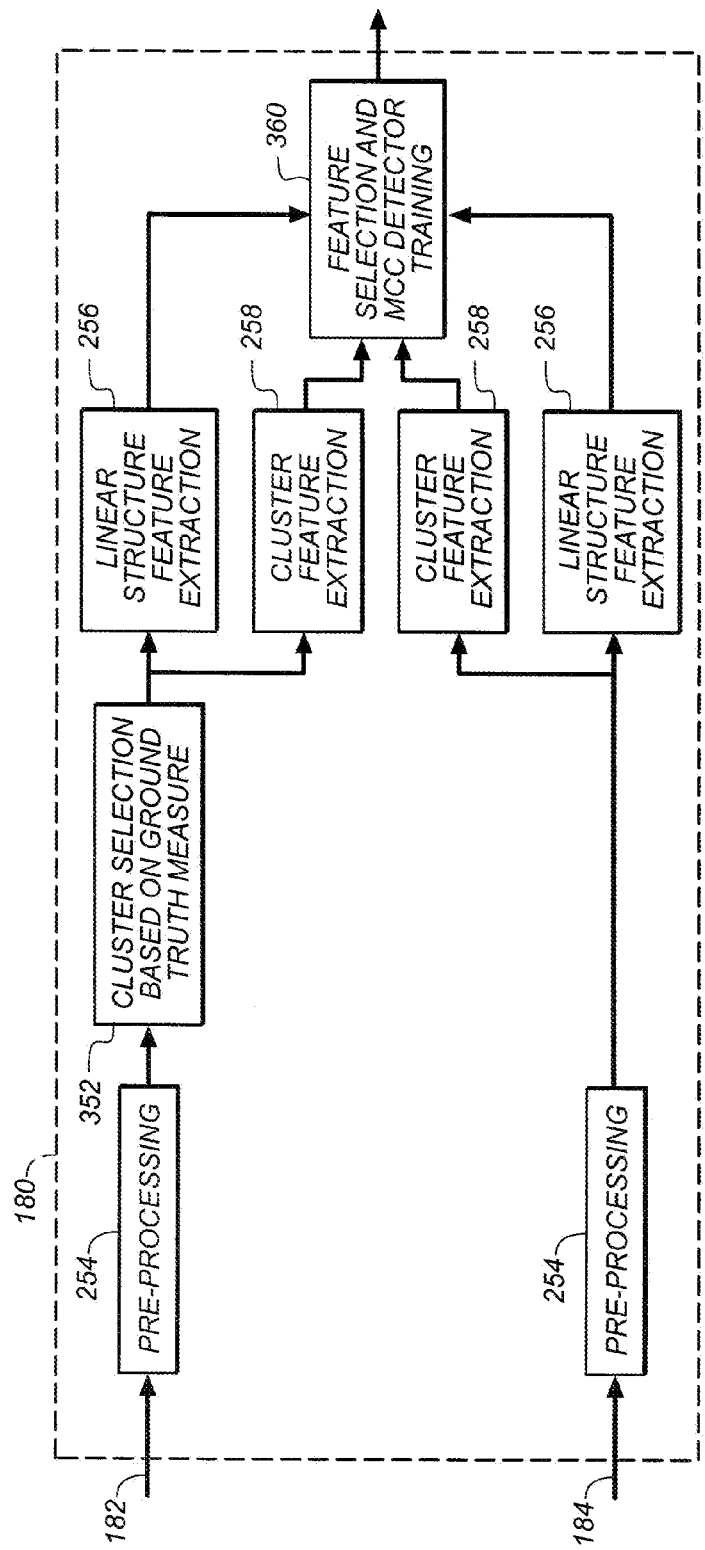
FIGS. 3(A) and 3(B) illustrate exemplary workflows for mcc detector training for the current invention.

FIG. 3(A) depicts an exemplary workflow of Mcc detector training 180. A plurality of normal (non-cancerous) mammographic images 184 are processed in Pre-processing step 254 which applies various image processing algorithms such as filtering, morphological processing, spot feature extraction, etc. to the incoming normal images to form normal clusters. These clusters are processed in steps 256 and 258 where linear structure features and cluster features are extracted. Similar to the categories of spots features, exemplary cluster features may include density features, boundary features, morphological features, texture features, distribution features among others. Exemplary linear structure features are to be discussed in depth in later sections.

Different from the normal mammographic image, a plurality of cancerous mammographic images 182 enter the step of Cluster selection based on ground truth measure 352 after step 254. The ground truth measure provides an indication of the degree of importance or involvement of a cancerous mammographic image or a true mcc cluster in mcc detection training. In the present invention, a ground truth measure may be represented by different tests.

One exemplary test is the number of true mcc clusters that are enclosed in the ground truth region that is defined by a radiologist.

Figure 8:
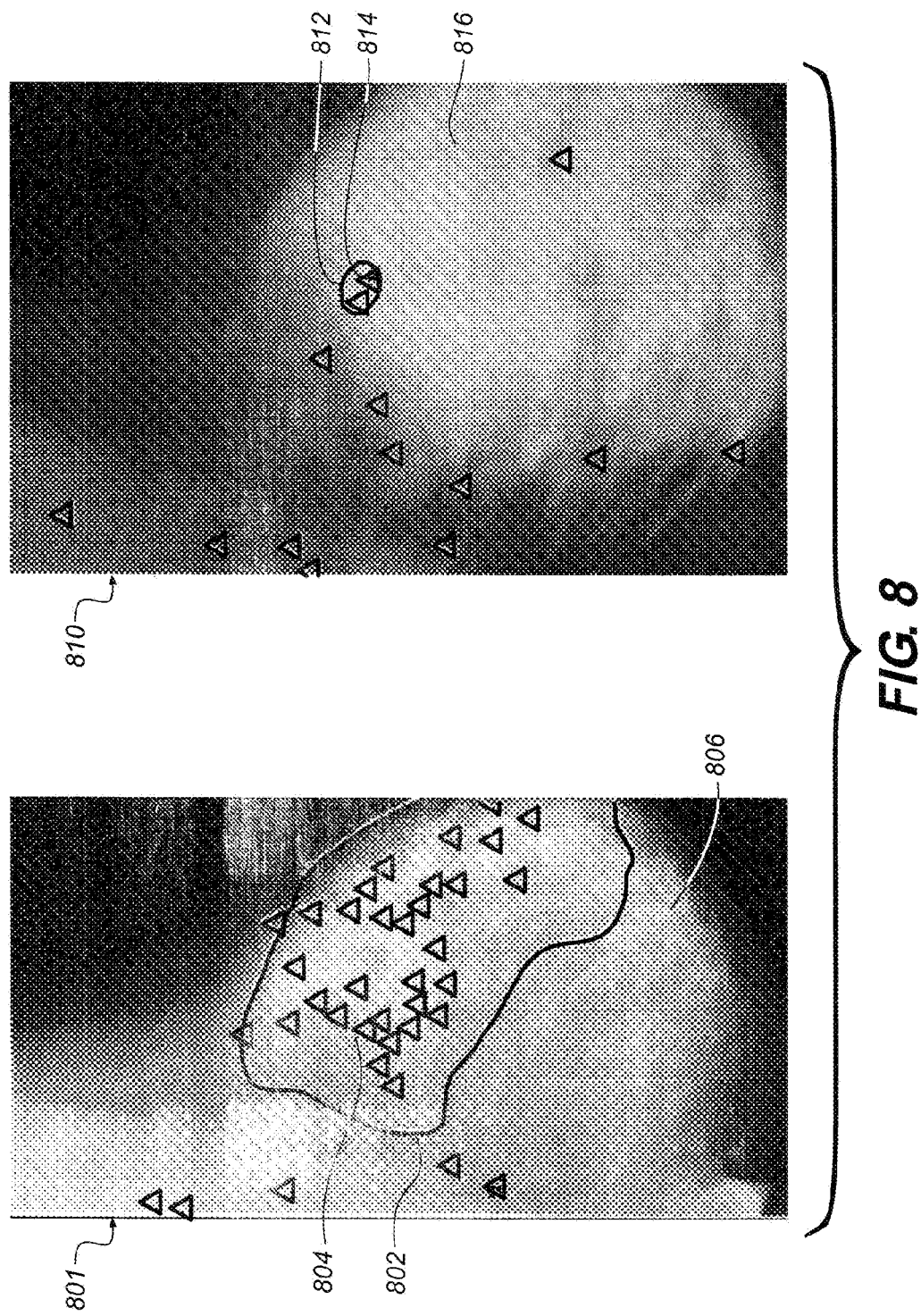
FIG. 8 is an illustration of mammographic images with mcc ground truth.

Referring to FIG. 8, there are shown two cancerous mammographic images 801 and 810. In image 801, clusters 804 that are enclosed by boundary 802 are truth mcc clusters that are verified by a radiologist. In this example, the region that is enclosed by boundary 802 is a ground truth region. For image 801, there are nearly 30 clusters inside boundary 804. In image 810, clusters 814 that are enclosed by boundary 812 are truth mcc clusters that are verified by a radiologist. There are only 2 clusters inside boundary 814. People skilled in the art understand that if clusters 804 and 814 are all included in a detector training process, with a high probability the detector will be trained in favor of the type of image 801 because clusters 804 outnumber clusters 814.

Therefore, to reduce the mcc detector training bias, devised in the present invention is a ground truth measure that tests the number of true mcc clusters that an image contains. If an image contains less than or equal to N true mcc clusters, these true mcc cluster are all used in detector training. If an image contains more than N true mcc clusters, randomly (or with some criteria, e.g. cluster ranking) choose up to N (including zero) true mcc clusters in said image for detector training. In other words, if a cancerous mammographic image contains too many truth mcc clusters, randomly remove a certain number of truth mcc clusters and use the remaining true mcc clusters in the mcc detector training process. In some cases, even the image itself could be removed. An exemplary value for N could be 4 in the present invention.

Another exemplary test for ground truth measure is the size ratio of ground truth region size and the size of the breast in a mammographic image. Referring to images 801 and 810, the ratio of ground truth (inside boundary 812) size and the size of the breast 816 is much smaller than the ratio of ground truth (inside boundary 802) size and the size of the breast 806.

If the size ratio for an image is smaller than or equal to a value M, the true mcc clusters in said image are all used in mcc detector training. If the size ratio for an image is larger than a value M, randomly (or with some criteria, e.g. cluster ranking) choose up to N (including zero) true mcc clusters in said image for mcc detector training. An exemplary value for M could be 0.1.

It will be appreciated that variations can be effected by a person of ordinary skill in the art without departing from the scope of the design of ground truth measure of the present invention.

Features extracted in steps 256 and 258 in FIG. 3(A) are fed to step 360 for feature selection and Mcc detector training. These extracted features will be evaluated in step 360. Since each feature has been carefully chosen to separate cancer cases from normal cases, it is reasonable to expect that there will be some separation in feature space between a set of normal candidates and a set of cancer candidates. Exemplary requirements state that the linear separation of each feature be at least, e.g., 55%, which means that 55% of candidates be classified correctly with a linear classifier. The exemplary requirement leads to a single alternative: to use a linear classifier to evaluate the features. One alternative for a linear classifier is to assume a Gaussian distribution (with equal variances) and construct a classifier under this assumption. This alternative is described in numerous basic statistics books, for example, linear discriminator classifier, and is easy to implement.

In general, feature selection and detector training involve manual operations. The user must select or de-select features from a list. The updated feature list is automatically saved and can be compared to other feature sets by classifying with a linear classifier or Neural Net (NN). The user also has the ability to view histograms of each feature and scatter plots of features (in 2 dimensions), comparing cancerous lesions and normal areas, which also helps in assessing the relative quality of features.

An alternative is to automatically analyze the features, selecting the best combination. The disadvantage of this is that there is no clear method to determine what is the best combination of features. First, criteria must be defined (most likely a classification or distance metric, separating normal regions from cancerous lesions). Second, a systematic procedure to combine features must be defined. At the extreme, every combination of n features can be processed. However, this may be very time consuming depending on the criteria. Another option is to start with no features and iterate, adding the 'best' feature at each iteration until the criteria no longer improves.

Here, detector training refers to the process involving 'training' data (a subset of the overall data that have been determined as normal or cancerous) which are selected features. In the case of NN, training involves using the training data to tune the NN's weights.

An NN can be described as a system of weights connected by non-linear activation functions. The activation function is usually a squashing function, such as a hyperbolic tangent, which forces all inputs to the range of (−1, +1). To train, the NN uses the true class of each candidate to compute an error function. For example, the square error is the square of the difference between the output of the NN and the true class of the candidate. In the worst case, the square error will be 4 and in the best case it will be 0. Each candidate is passed through the NN and the error is computed. The error is then fed back through the network and each weight is updated in a manner that reduces the error. The degree to which each weight is adjusted is determined by a user parameter called the learning rate, which scales the weight update factor. The user also decides on the overall size of the NN, which determines the degree of complexity of the NN.

In the end, several parameters of the NN can be adjusted (the error function, the activation function, the update procedure, . . . ), but the two mentioned above (learning rate and size) are the most important. The learning of the NN can be evaluated by plotting the mean square error (mse) of all the candidates as the NN is trained. Given a subset of candidates that is not used to train, but is evaluated each iteration, the user can observe how well the NN generalizes to new data. A well trained NN usually will have this test or evaluation data's mse follow the training mse closely. The test mse will tend to be greater than the training mse, but the relative closeness of the two is more important. If they diverge, it indicates that the NN is memorizing the training data.

A trained mcc detector in step 180 is used in step 160 for mcc detection and the results are displayed to the user. The dashed arrow from step 180 to step 160 in FIG. 1 indicates that there is no "on-line" connection between step 180 and step 160. Step 180 is performed "off-line". The feature selection and NN structures and parameters learned in step 180 are used/implemented exactly in step 160 (to be exact, in step 260 in FIGS. 2(A) and (B)).

Figure 3B:
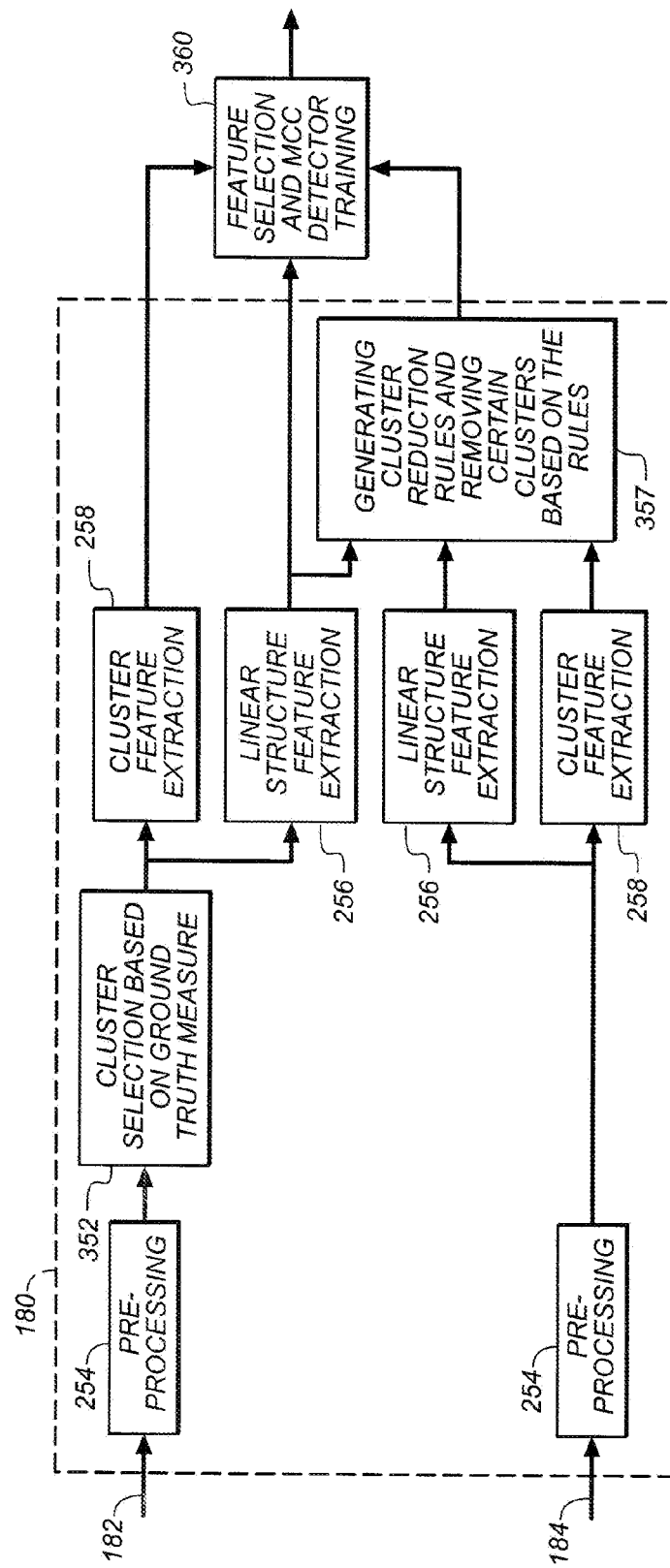

FIG. 3(B) depicts another exemplary workflow of mcc detector training 180. The basic structure in this exemplary workflow is the same as the one shown in FIG. 3(A) except that a certain number of normal clusters are potentially removed in step 357 before step 360. These potentially removed normal clusters are confirmed to be associated with linear structures based on the cluster reduction rules (step 357). It is known to the people skilled in the art that the majority clusters that are associated with linear structures are non-cancerous. Removing the clusters that are associated with linear structures may improve the performance of feature selection and mcc detector training in step 360. The cluster reduction rules are discussed in a later section "Cascade Rule Based Linear Structure Classification". This alternative workflow shown in FIG. 3(B) provides necessary information for mcc detection workflow displayed in FIG. 2(B).

Curvilinear structures are curvilinear appearance of blood vessels, lactation ducts, and ligaments of the breast projected on a mammogram. Vascular lines are large calcified blood vessels on a mammogram. Microcalcifications are bright spots on mammograms and usually the only signs indicating early breast cancers. Microcalcification spots appear usually in clusters, and malignant microcalcification spots usually have irregular shapes. The curvilinear structure is a net of massive and complex curvilinear markings on a given mammogram. Due to the projection of three-dimensional breast into a two-dimensional mammogram, different parts of the curvilinear structure may have different appearances with varying width, lengths and different contrasts to the surrounding breast tissue. The option of pre-classification global mask generation to extract curvilinear structure may be of limited use because global curvilinear marking is a massive structure, and accurate mask extraction is not an easy task. A global mask tends to extract only small portion of linear structure or extract too many "lines".

An alternative is, after forming mcc candidate clusters in step 254 in FIGS. 2(A) and 2(B), to identify linear structures only in the neighborhood where the mcc candidate clusters reside. For each of the candidate clusters, a region of interest (ROI) is defined that encloses the mcc candidate spots of each of the mcc candidate clusters. An mcc candidate spot is a spot contained in the mcc candidate cluster that is under testing for cancerous lesions. A linear structure identification procedure is applied to a small region (ROI) centered around each mcc candidate cluster to avoid the unnecessary influence from the rest of the breast. It reduces processing time since the number of mcc candidate clusters is limited and only a small portion of the breast area needs to be processed, in comparison to a global line mask approach.

The alternative is applicable to the process shown in FIGS. 3(A) and 3(B).

Figure 4:
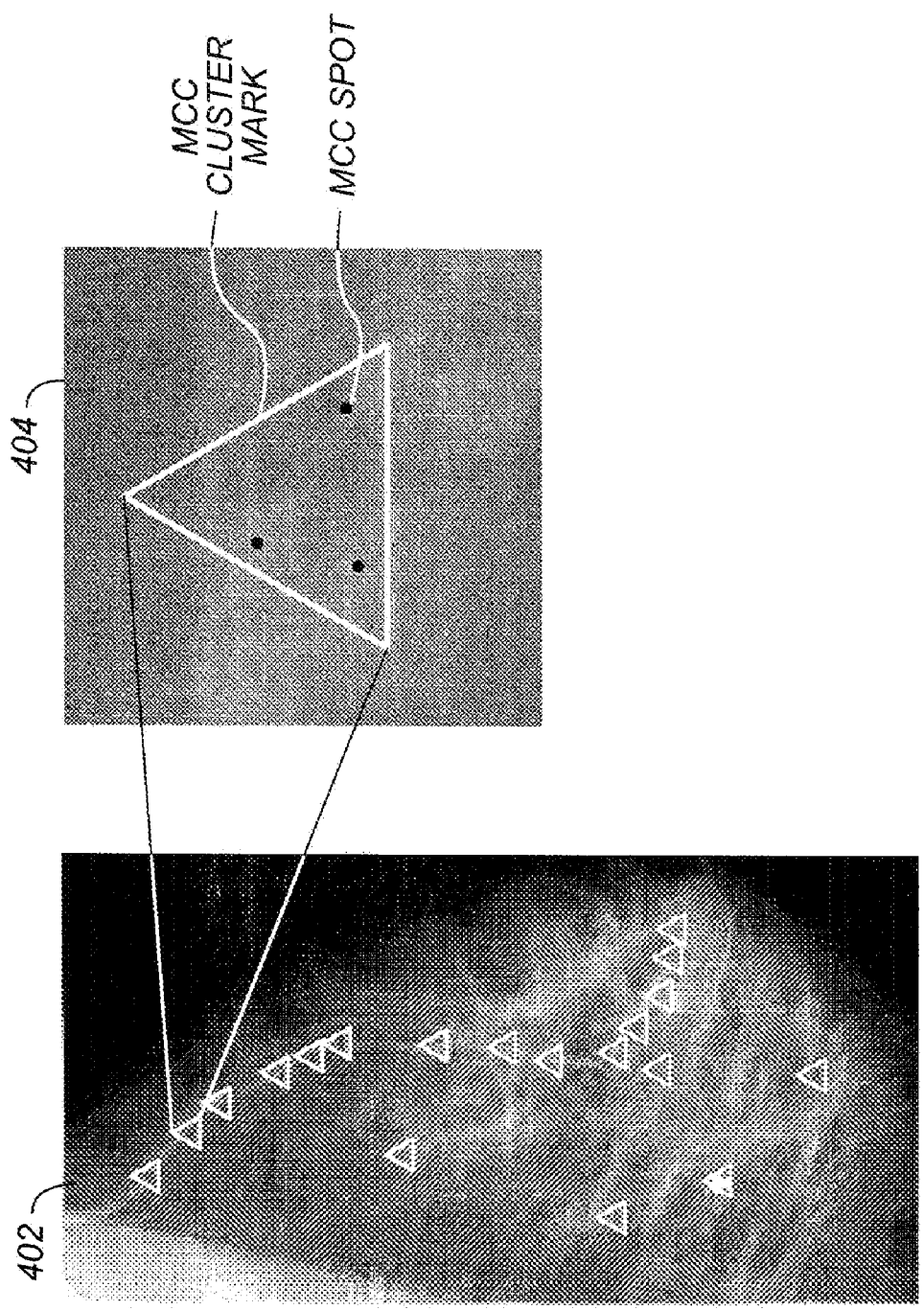
FIG. 4 is a graph illustrating exemplary mcc candidate clusters in a mammogram.

FIG. 4 shows an exemplary mammogram 402 with small triangles that indicate the mcc candidate clusters identified in the pre-processing state. On the right side in FIG. 4, it shows an enlarged image 404 of the ROI that contains one of the mcc candidate clusters.

The method of microcalcification detection in mammographic images proposed in the present invention employs several identifiable features that are extracted from the gradient magnitude and Hough parameter domains. The following three sections describe the generation of linear structure features that are used in step 256 in FIGS. 2(A), 2(B), 3(A), and 3(B).

Features of Ensemble Average of Lines in Gradient Magnitude Space

Figure 9:
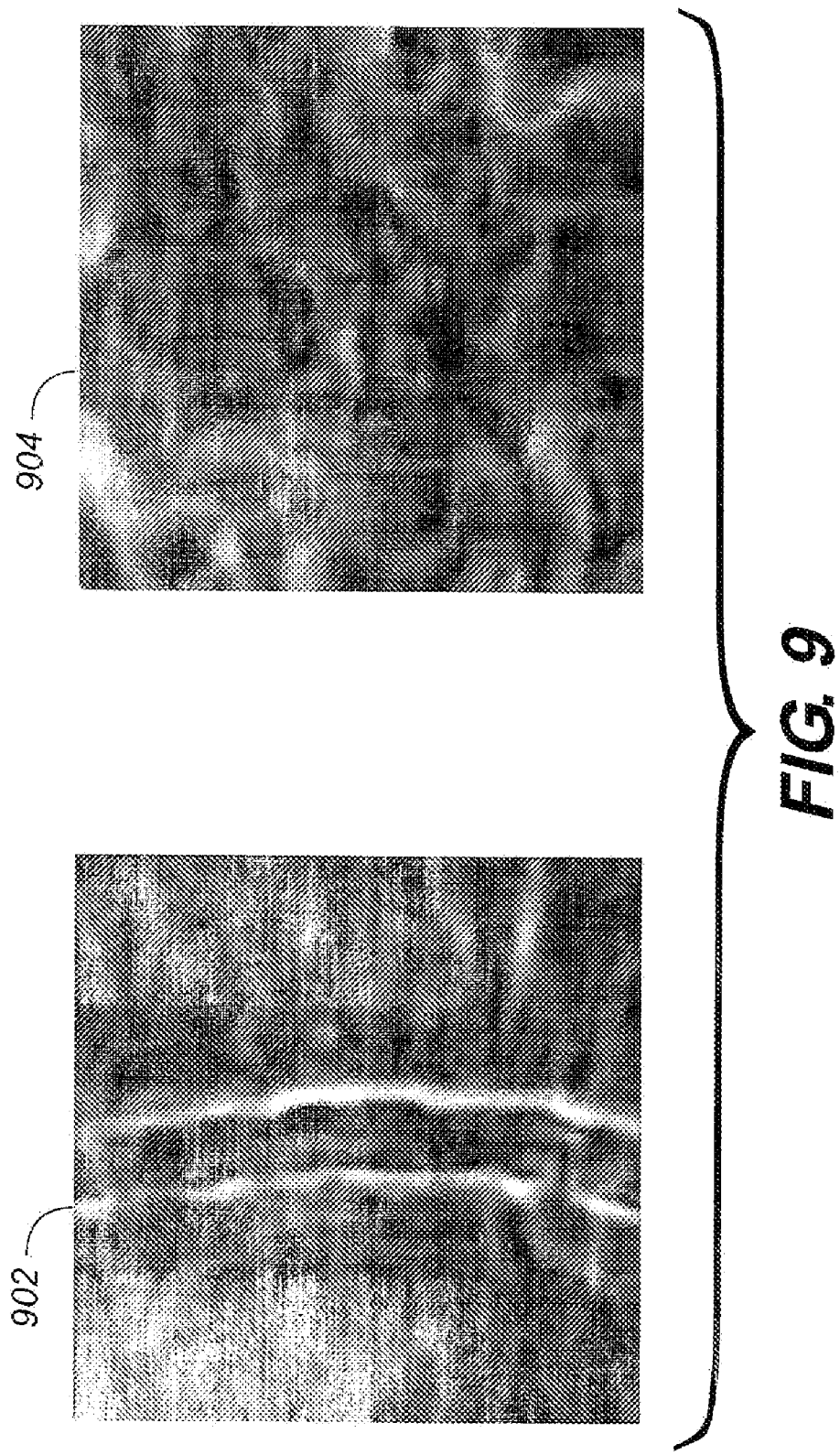
FIG. 9 is an illustration of exemplary regions of interest in the gradient magnitude space.

In the linear structure classification step, intensity ROI 404, as in FIG. 4, is transformed to a gradient magnitude ROI (gROI). The benefit of working in the gradient magnitude space is that the statistics gathered from gROI are essentially intensity invariant. FIG. 9 displays a few exemplary gROIs used in the present algorithm. Noted that the position and size of an ROI are determined by the positions of the underlying mcc candidate spots that said cluster contains.

The linear structure identification process starts with extracting information from a rotateable band that covers all or part of candidate spots in the mcc candidate cluster under investigation. Said rotateable band comprises a plurality of gROI image pixels. Said plurality of gROI pixels change when said rotateable band rotates around the geometric center of the band. The mathematical derivation of the rotateable band is given next. Note that it will be appreciated that variations and modifications can be effected by a person of ordinary skill in the art without departing from the scope of the invention.

Figure 10:
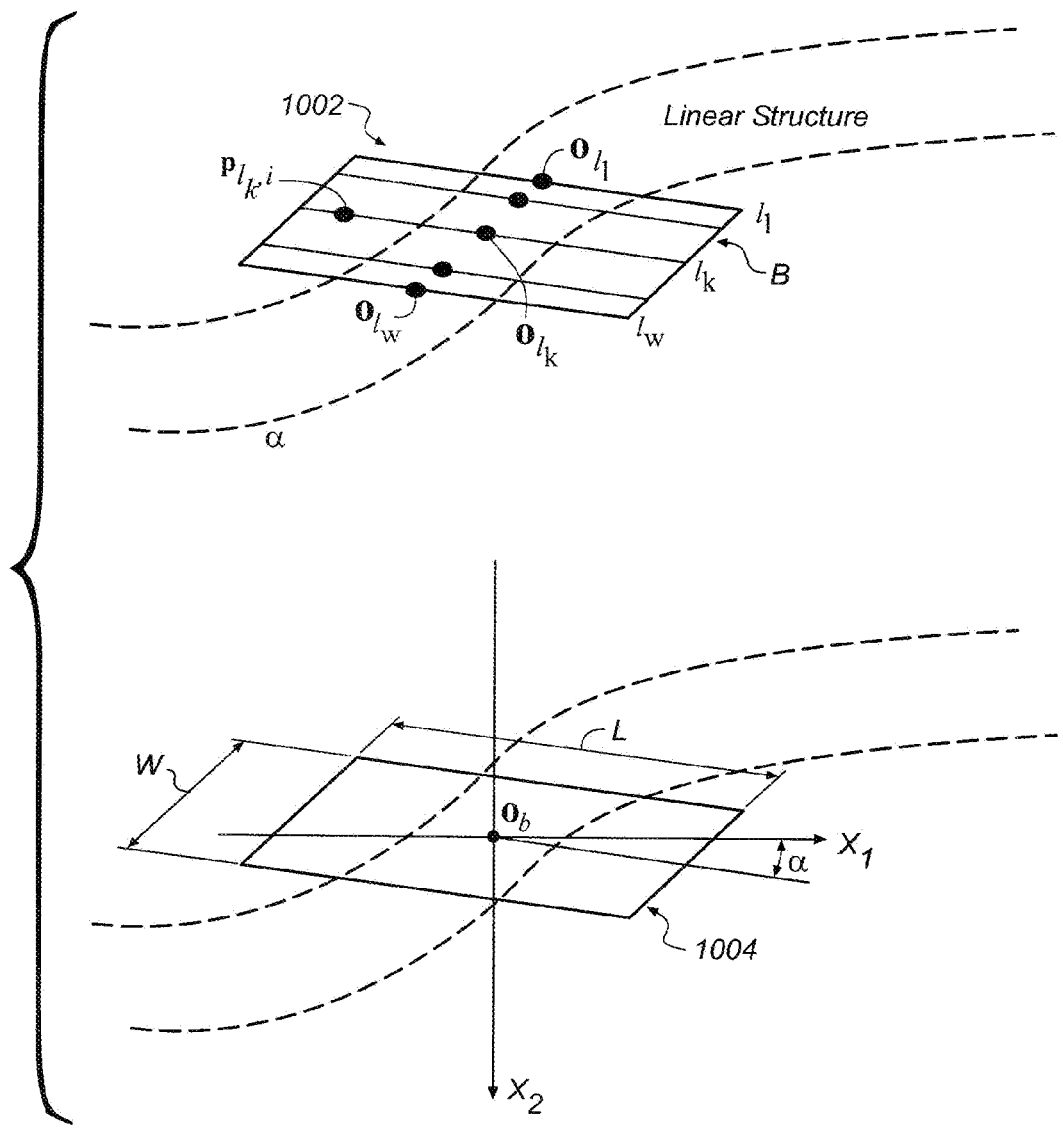
FIG. 10 is an illustration of graphs of rotateable bands.

FIG. 10 depicts a sketch 1002 of a linear structure and a rotateable band. Define the band center $o_b$ as the origin of a local coordinate system $(x^1, x^2)$ (in graph 1004) whose axes are parallel to the image (gROI) coordinate system axes. Angle $\alpha$ determines the band orientation with respect to the local coordinate system.

Denote the rotateable band by $B(\alpha)$ that contains W lines $l_k(\alpha)$:

$$B(\alpha) = \{l_k(\alpha)\}; k \in [1, \ldots, W] \quad (1)$$

Denote the line center of line $l_k(\alpha)$ by $o_{l_k}$. Denote a pixel on line $l_k(\alpha)$ by $p_{l_k,i}(\alpha)$. Line $l_k$ is a collection of pixels: $l_k = \{\hat{I}(p_{l_k,i}(\alpha))\}$; $i \in [-(L-1)/2, \ldots, (L-1)/2]$, L is the line length. Here $\hat{I} = |\nabla I|$ is the gradient magnitude image (gROI) of the intensity image (ROI) denoted by I. In the graph 1004 displayed in FIG. 10, the band is in a position where lines $l_k$ are approximately perpendicular to the medial axis of the linear structure. For notation simplicity, parameter $\alpha$ is omitted in some of the expressions in the following discussions.

Denote an ensemble average of the set of lines $\{l_k\}$ in the band by $s(\alpha)$ with elements $s_i(\alpha)$: $s(\alpha) = \{s_i(\alpha)\}$, where $$s_i = \frac{1}{W} \sum_{k=1}^{W} \hat{I}(p_{l_k,i}) \quad (2)$$

Referring back to FIG. 10, the pixel coordinate $p_{l_k,i}$ can be computed as $P_{l_k,i} = i f_l + o_{l_k}$; where the centers $o_{l_k}$ are obtained through $o_{l_k} = k f_b + o_b$; $k \in [-(W-1)/2, \ldots, (W-1)/2;]$;

$$o_b = \begin{bmatrix} o_b^{x1} \\ o_b^{x2} \end{bmatrix}; f_b = \begin{bmatrix} f_b^{x1} \\ f_b^{x2} \end{bmatrix} = \begin{bmatrix} \sin(\alpha) \\ \cos(\alpha) \end{bmatrix};$$

$$o_{l_k} = \begin{bmatrix} o_{l_k}^{x1} \\ o_{l_k}^{x2} \end{bmatrix}; f_l = \begin{bmatrix} f_l^{x1} \\ f_l^{x2} \end{bmatrix} = \begin{bmatrix} \cos(\alpha) \\ -\sin(\alpha) \end{bmatrix}.$$

It may be noticed that the bands $B(\alpha)$ at different angles are not extracted through the conventional method of interpolation but through a simple sampling procedure that is quite adequate for the present application.

Various linear structure features can be generated from the processing of the bands. Two features are introduced in the present invention. One of the features is a maximum relative magnitude of the ensemble average curves. The relative magnitude of the ensemble average curve of a set of lines in the band at a particular angle is simply defined as:

$$\Psi(\alpha) = \max(s(\alpha)) - \min(s(\alpha)) = \max_i(s_i) - \min_i(s_i).$$

In practice, angle $\alpha$ is chosen at a few discrete orientations. Therefore, the relative magnitude of the ensemble average curve can be expressed as $\Psi(\alpha_j) = \max(s(\alpha_j)) - \min(s(\alpha_j))$; $j \in [1, \ldots, N_\alpha]$. It can be further simplified as $\Psi_j = \max(s_j) - \min(s_j)$; $j \in [1, \ldots, N_\alpha]$.

The maximum relative magnitude of the ensemble average curve is then obtained as $$\Psi = \max_j(\Psi_j). \quad (3)$$

Accordingly, band $B_j$ that produces maximum relative magnitude is denoted by $B_\Psi$.

With the relative magnitude of the ensemble average curve, another feature, ensemble average ratio $\Re$ can be computed as:

$$\Re = \max_j(\Psi_j) \Big/ \min_j(\Psi_j). \quad (4)$$

If an mcc candidate cluster is not associated with a linear structure the ensemble average ratio $\Re$ is close to 1, which signifies the 'isotropic' nature of the underlying structure measured by using the ensemble averaging. On the other hand, if an mcc candidate cluster is associated with a linear structure the ensemble average ratio $\Re$ moves away from 1, which signifies the 'anisotropic' nature of the underlying structure.

Features in Hough Transformation Domain

Two features from the Hough Transformation domain are used in the linear structure identification process in the present invention.

It is known that Hough Transform maps points on a line in Cartesian space to curves (sinusoids) in the Hough parameter space. Points that are collinear in the Cartesian space generate curves that intersect at a common point (forming a peak in the Hough parameter space).

Referring to FIG. 10, each point $p_{i_k,i}$ in band $B(\alpha)$ that has a Cartesian coordinate is transformed into a discretized $(r,\theta)$ curve in Hough parameter space; where r is the length of a normal from the origin to line in band $B(\alpha)$ and $\theta$ is the orientation of the normal with respect to the $x^1$ axis.

For the exemplary gROI 902 shown in FIG. 9, there will be two high peaks in the Hough parameter accumulator array indexed with discretized r and $\theta$. These two peaks will appear approximately at the same angle $\theta$ but at different r lengths. It is therefore a feature (or measure) of "angle spread" $\delta_\theta$ is defined as following.

Denote the Hough peak array by $H=\{h_{i,j}\}$ and its corresponding angle array by $\Theta=\{\theta_{i,j}\}$; where $i\in[1,\ldots,N_r]$; $j\in[1,\ldots,N_\theta]$. $N_r$ is the number of quantized length intervals and $N_\theta$ is the number of quantized angle intervals.

Collect a subset $H^s=\{h_{i,j}^s\}$ of H; the elements, $h_{i,j}^s$ all have values above ℵpercent of the highest peak value in H. Correspond to the subset $H^s$, there is a subset $\Theta^s=\{\theta_{i,j}^s\}$ of $\Theta$. The angle spread $\delta_\theta$ can be readily computed as $$\delta_\theta = \left| \max_s(\Theta^s) - \min_s(\Theta^s) \right|. \quad (5)$$

It is appreciated that if there are parallel thin lines presented in a band $B(\alpha)$, the angle spread $\delta_\theta$ for that band must be zero or close to zero. On the other hand, if random structures are presented in a band $B(\alpha)$, the angle spread $\delta_\theta$ will be large.

Another feature from Hough space is the normalized maximum Hough peak that is simply defined as $$\varphi_h = \max_{i,j}(h_{i,j}^s) / \text{sum}(h_{i,j}). \quad (6)$$

Additional Measure for TP Protection

Figure 11:
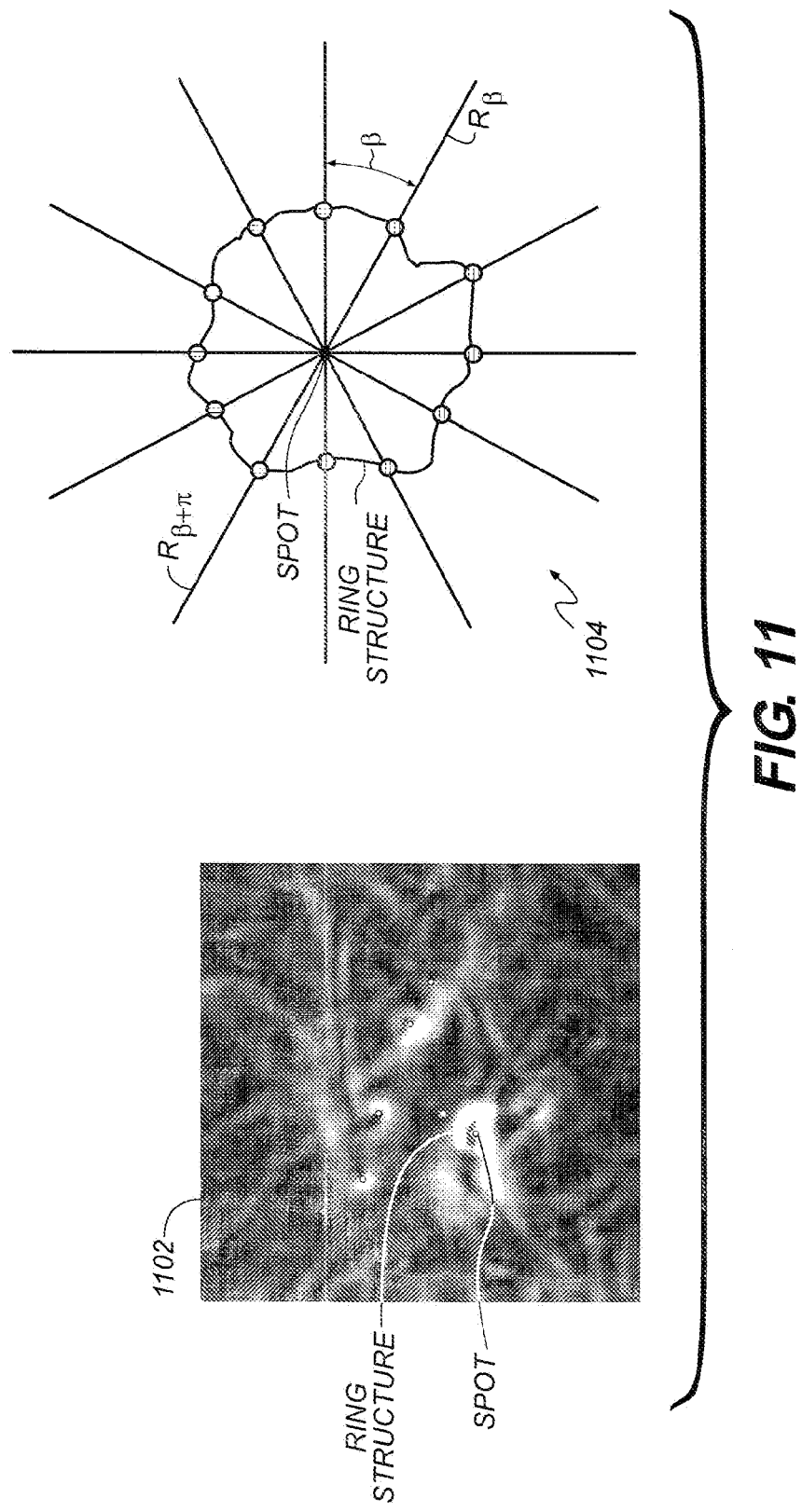
FIG. 11 displays an exemplary of a region of interest with ring-like structure and a graph illustrating a ring-like structure search method.

It is observed that some of the true (i.e. malignant) mcc clusters may reside in an area where linear structure-like objects are present and can be verified as FPs. It is also observed that true mcc clusters may possess topological ring-like structures surrounding some of the spots (see a gROI 1102 in FIG. 11). A method is hence crafted to take advantage of the ring structure in a cluster to protect true mcc clusters.

Using an mcc candidate spot as the origin, perform a search along a ray that radiates from the origin until the ray hits the ring or reaches a predefined distance without a hit. The search process can be formulated as following (referring to graph 1104 in FIG. 11).

Denote a ray by $R_{k\beta}$ and its opposite ray by $R_{k\beta+\pi}$, where $\beta=\pi/N_R$; $k\in[1,\ldots,N_R]$. $N_R$ is a positive integer greater than one. Denote a hit array by $T=\{t_k\}$. The array elements $t_k$ are initialized as zero. Only if both $R_{k\beta}$ and $R_{k\beta+\pi}$ hit a ring, the corresponding array element $t_k$ will be set to one, otherwise, the corresponding array element $t_k$ remains zero.

A simple measure is therefore defined as the sum of hits $\xi_t$ that a hit array has. The measure is simply computed as $$\xi_t = \sum_k t_k. \quad (7)$$

Cascade Rule Based Linear Structure Classification

The features described in the above sections are not only used in step 360 mcc detector training and step 260 mcc detection but also used in step 257 removing certain clusters based on cluster reduction rules.

The cluster reduction rules are contained in a cascade rule based linear structure identification algorithm.

The relative magnitude of the ensemble average curve and the ensemble average ratio are the first two features that are evaluated to identify linear structures. This first evaluation process tags a cluster with a status of being associated with linear structures (LS), not being associated with linear structures (nonLS), or uncertain. As a result, any mcc candidate cluster in an uncertain status will be further evaluated by the rules that are applied to the features of Hough parameters.

It is noted that the first evaluation operation on ensemble averages is, in general, not orthogonal to the second evaluation operation on Hough parameter in the present application. In other words, these two operations may explore the same underlying evidence to support the linear structure classification process. It is, however, from the computational complexity point of view, that the computation of ensemble averaging is linear while Hough Transformation is nonlinear in nature. Also, the execution of ensemble averaging of lines is performed at multiple angles. The Hough Transform is performed at a single angle position that is determined by the first evaluation operation of ensemble averaging of lines in the rotateable band.

The above discussed algorithm is summarized below. The paragraphs following the algorithm summary explain the workings of the algorithm:

```
for each_clst do
    gROIgnrt(clst,img,gROI);
    for each α_j where j ∈ [1,...,N]do
        bandXtrct(clst,gROI,B_j,α_j);
        bandPfling(B_j,s_j);
    end
    profileFeatureXtrct(∀s_j,Ψ,ℜ); where j ∈ [1,...,N]
    apply ProfileRules (clst,Ψ,ℜ);
    if status(_clst) == uncertain
        bandHoughTrnsfm(B,H,Θ);
        HoughFeatureXtrct(H,Θ,δ_θ,φ_h);
        applyHough Rules (clst,δ_θ,φ_h);
    end
    if status(clst) == LS
        ringHitChk(clst,gROI,ξ_t);
        applyRingHitRules(clst,ξ_t);
    end
end
```

Function gROIgnrt(clst,img,gROI) crops a region of interest (gROI) from the input gradient magnitude mammogram (img) using the position information of the underlying mcc candidate cluster (clst). The size of the gROI depends on the spread of mcc candidate spots within the cluster.

Function bandXtrct(clst, gROI, $B_j$, $\alpha_j$) further crops a band $B_j$ at angle $\alpha_j$ from gROI. The center of the cropped band is at the geometric center of the spots within the cluster clst. In practice, the shape of a band is a square so that two, not one, ensemble average curves of two sets of lines (with respect to $\alpha_j$ and $\alpha_j+\pi/2$) can be computed (see Equation 2) with one band.

Function profileFeatureXtrct($\forall s_j$, $\Psi$, $\Re$) collects the ensemble averages and computes features (or measures) $\Psi$ and $\Re$ according to Equations 3 and 4.

Function applyProfileRules(clst, $\Psi$, $\Re$) evaluates $\Psi$ and $\Re$ with pre-determined boundaries (thresholds) then tags the cluster clst with a number indicating the status as 'LS (associated with linear structure)', 'nonLS (not associated with linear structure)', or 'uncertain'. The evaluation criteria will be detailed later.

If a cluster is labeled as 'uncertain', the cluster will be further evaluated by first applying a Hough Transform band-HoughTrnsfm(B, H, $\Theta$) to the band and generating a Hough peak array H and an angle array $\Theta$. The band B used in function bandHoughTrnsfm( ) could be the one (denoted by $B_\Psi$) that generates the maximum relative magnitude of the ensemble average curve in Equation 3. Or it could be a band having a different (usually larger) size but with the same orientation and center position as $B_\Psi$.

Function HoughFeatureXtrct(H, $\Theta$, $\delta_\theta$, $\phi_h$) executes Equations 5 and 6. Function applyHoughRules(clst, $\delta_\theta$, $\phi_h$) evaluates $\delta_\theta$ and $\phi_h$ with pre-defined thresholds and tags the cluster clst with a number indicating the status as 'LS', or 'nonLS'.

If, after evaluating the features of the rotateable bands, a cluster is labeled as LS (associated with linear structure), function rightHitChk(clst, gROI, $\xi_r$) computes $\xi_r$ (see Equation 7) that is evaluated in function applyRingHitRules(clst, $\xi_r$). It basically checks the number of hits that each of the spots has in a cluster and changes the status from LS to nonLS if the maximum number of hits that any one of the spots has exceeds a threshold. The purpose of employing function rightHitChk (clst, gROI, $\xi_r$) is to analyze said band and the use function applyRingHitRules(clst, $\xi_r$) to remove the tag LS that is attached incorrectly.

Figure 12:
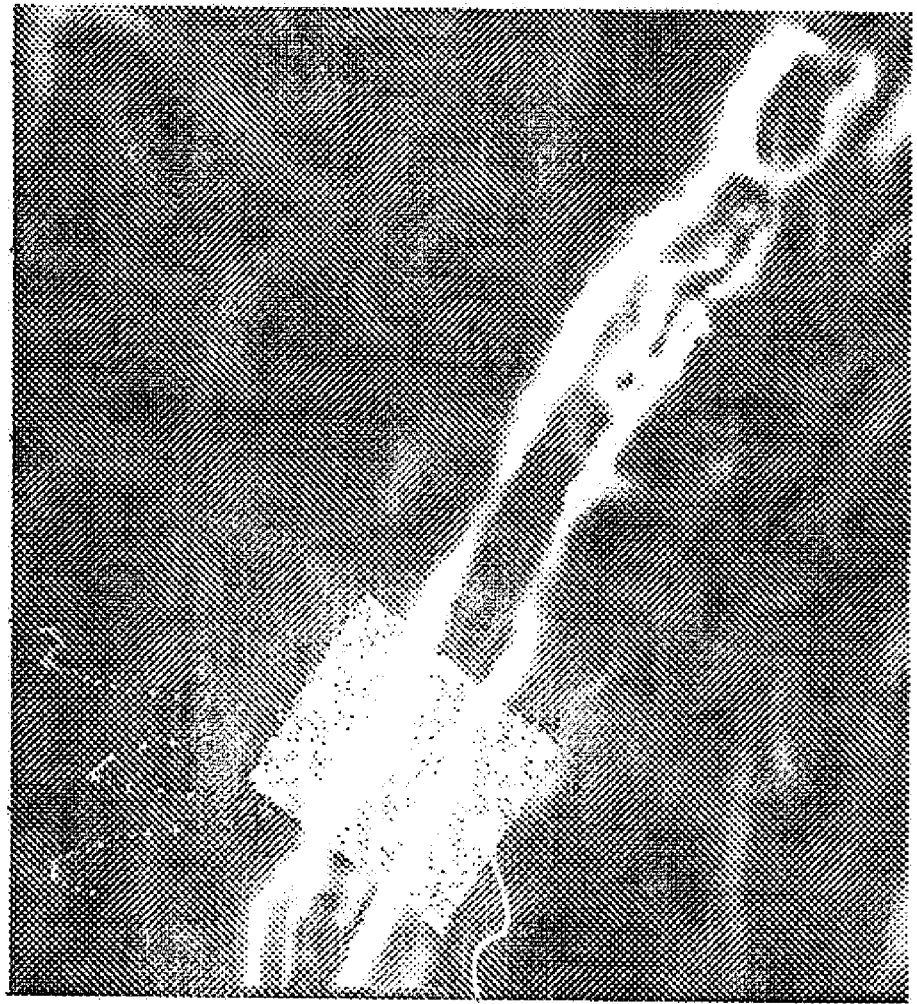
FIG. 12 is an illustration of an exemplary band that covers a blood vessel in a region of interest in a gradient magnitude image.

The cluster reduction algorithm developed in the present invention has been applied to clinical mammograms for assessment. FIG. 12 shows an exemplary band 1202 that covers part of a blood vessel in a gradient magnitude image (gROI).

Figure 13:
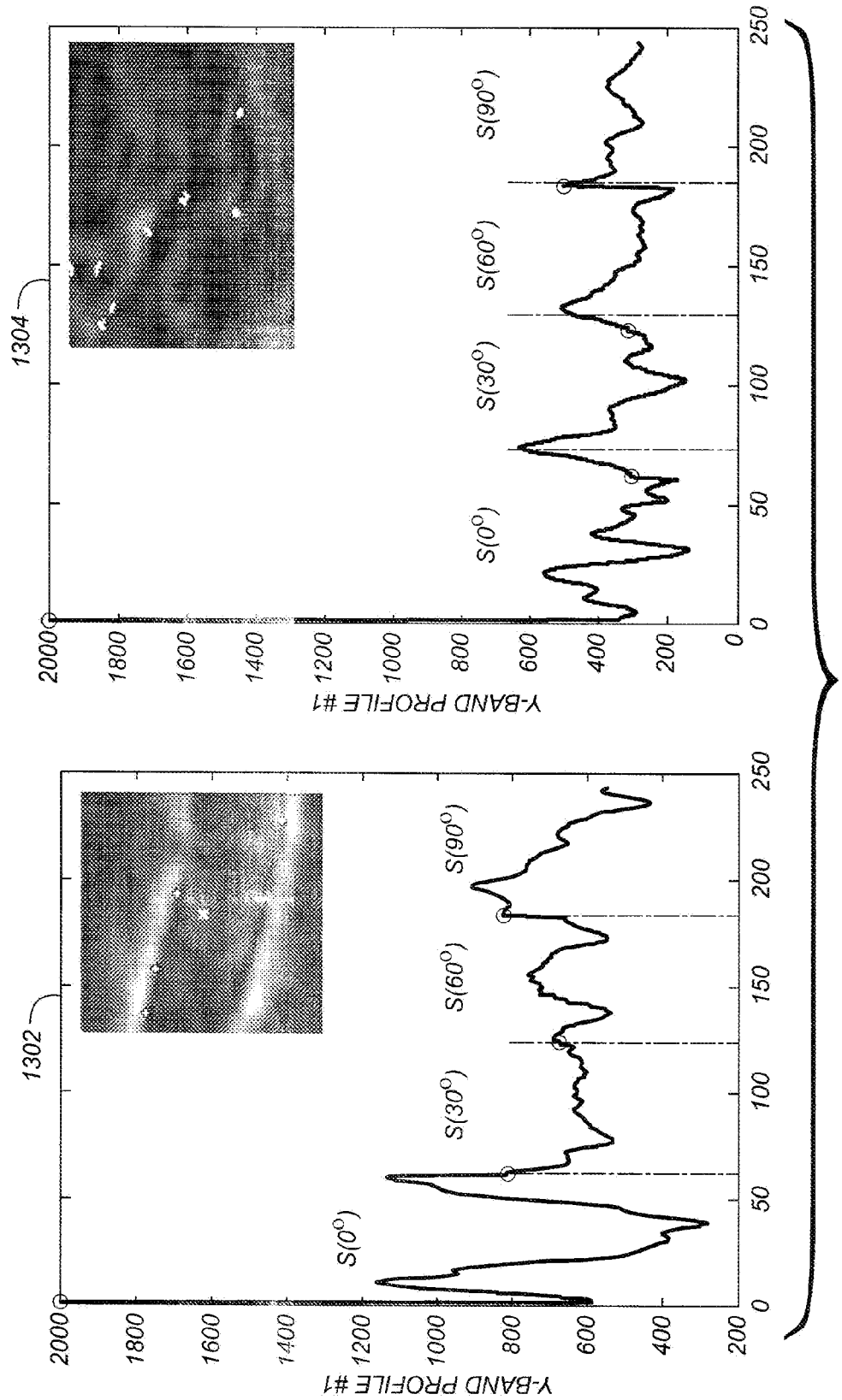
FIG. 13 is a graph illustrating exemplary curves of ensemble average of sets of lines in a rotateable band when said band is at different angles.

FIG. 13 depicts the ensemble averages 1302 s($\alpha$) of band lines at 4 different angles for a gROI that has a linear structure. The ensemble average curve s(0°) at 0° has the highest relative magnitude comparing to the other three. These four ensemble average curves possess kind of 'anisotropic' property in terms of the relative magnitude. While the curves in graph 1304 in FIG. 13 display near 'isotropic' property for a GROI that does not have a linear structure.

Figure 14:
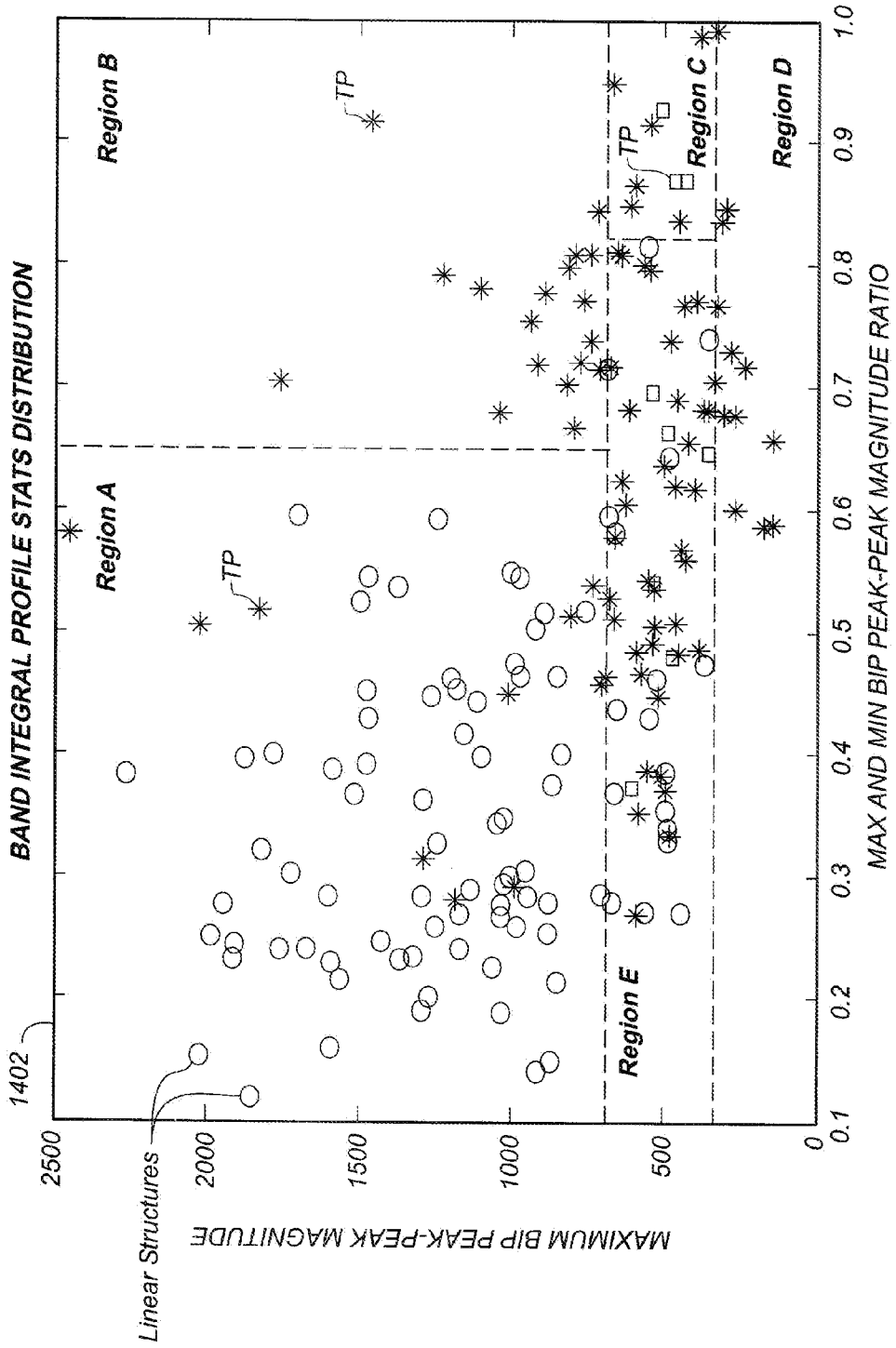
FIG. 14 is a graph illustrating an exemplary distribution of features related to ensemble average of lines.

The distribution 1402 of features $\Psi$ and $\Re$ is obtained from a number of training cancerous and normal mammograms and shown in FIG. 14. It demonstrates that features $\Psi$ and $\Re$ provide a statistically satisfactory separation for the clusters that have linear structures (LS) and the clusters that are true-positives (nonLS). Although sophisticated algorithms such as a Support Vector Machine (SVM) supervised learning algorithm could be used to find the feature separation boundaries, the distribution in FIG. 14 is empirically divided into different regions. LS Clusters are concentrated in region A, while nonLS clusters spread mostly in regions B, C and D. Region E contains the clusters with uncertain status. Exemplary rules are devised based on the division of the above regions in the present invention for function applyProfileRules(clst, $\Psi$, $\Re$). Exemplary predefined thresholding values for $\Psi$ are 700 and 300. Exemplary predefined thresholding value for $\Re$ is 0.6.

Figure 15:
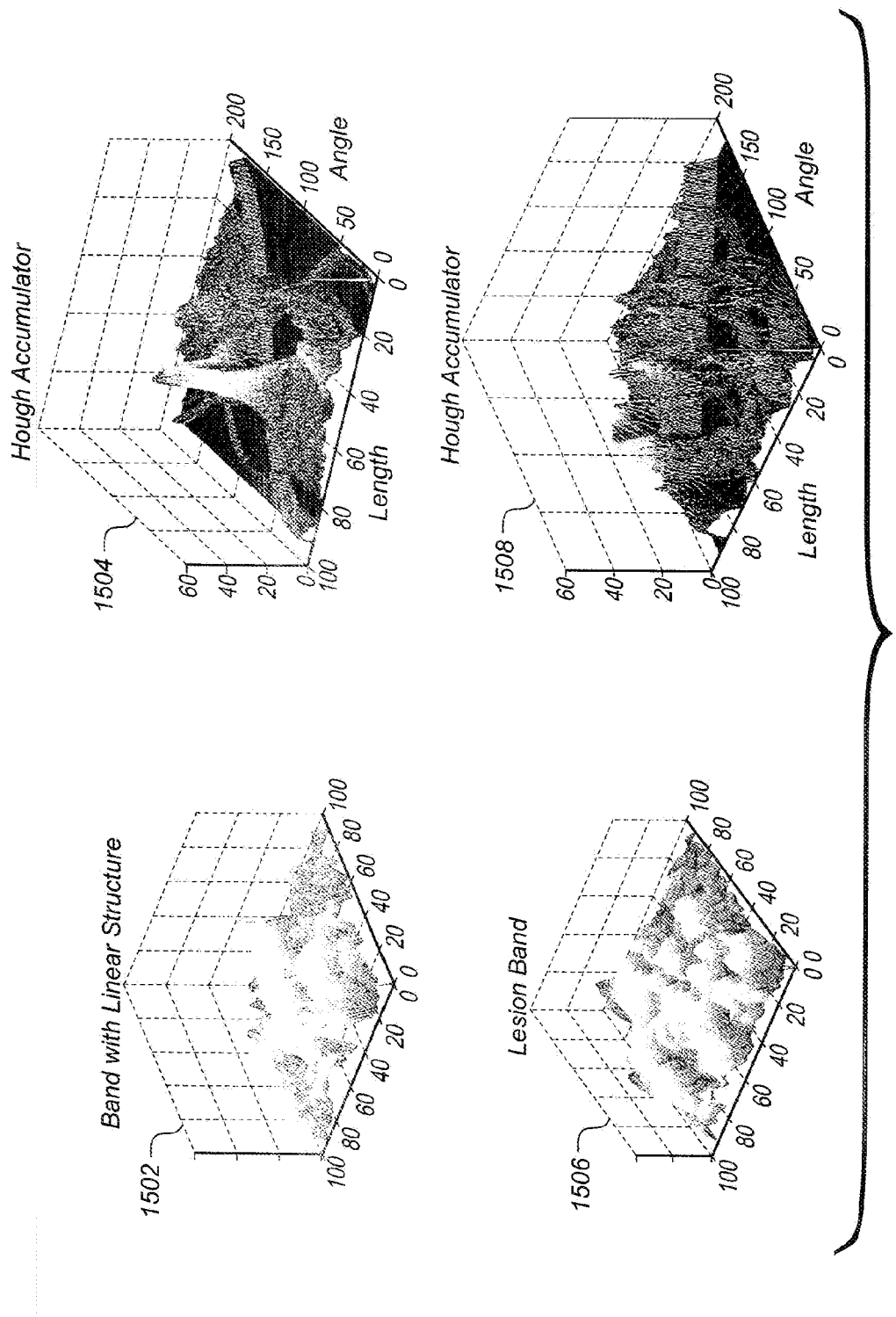
FIG. 15 displays exemplary regions of interest and their corresponding Hough accumulators.

FIG. 15 displays the 3D plot of a band 1502 with linear structures and its corresponding Hough accumulator 1504 plot with length r and angle $\theta$ axes. Set an exemplary $\aleph$=90. Intuitively, the angle spread $\delta_\theta$ for the elements $h_{i,j}^s$; having values above $\aleph$ percent of the highest peak value is very small. While for the lesion band 904 in FIG. 9, the angle spread $\delta_\theta$ obviously has a much larger value because of the multiple peaks with similar values sprouted across the angle axis in graph 1508.

Figure 16:
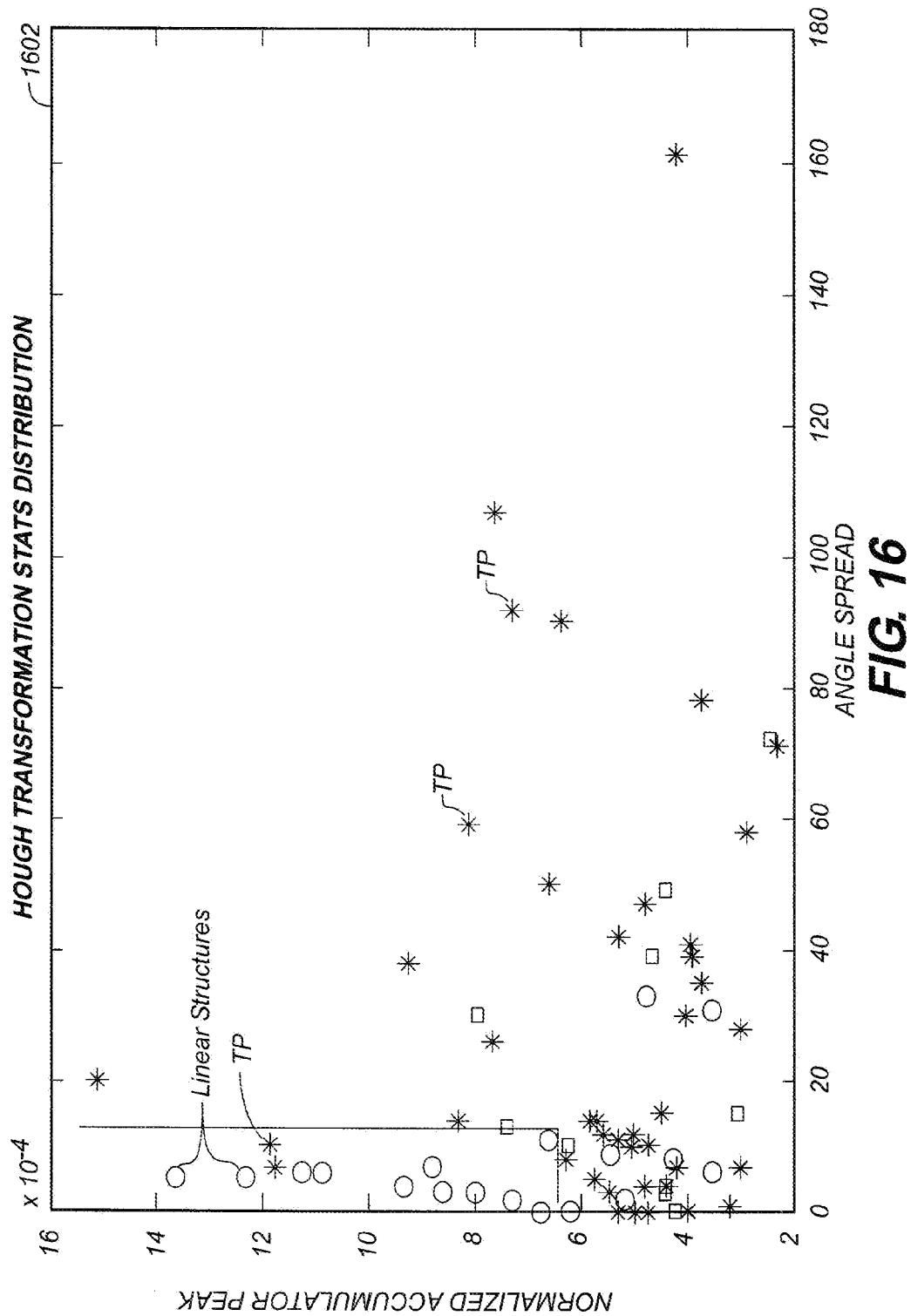
FIG. 16 is a graph illustrating an exemplary distribution of features related to Hough accumulator.

The distribution 1602 of features r and $\theta$ in FIG. 16 also shows a good separation between the LS clusters and nonLS clusters. The solid lines in FIG. 16 provide the empirical thresholds for the execution of function applyHoughRules (clst, $\delta_\theta$, $\phi_h$). Exemplary predefined threshold $\delta_\theta$ for is 10 and exemplary predefined threshold for $\phi_h$ is 0.0005.

It stated previously that the linear structure classifier in step 256 could be configured or reconfigured by commands from the human operator 168 through a command line 174 that is connected to step 158. The parameter selection 158 sends the selected parameters to the step 160 through path 176. For example, the cluster reduction algorithm can be configured so that a step of true positive protection is activated in the linear structure identification process. Exemplary functions contained in true mcc cluster protection are rightHitChk(clst, gROI, $\xi_r$) and applyRingHitRules(clst, $\xi_r$) that are described previously. The linear structure identification can also be configured so that numerical thresholds can be varied. Exemplary numerical thresholds are those used for parameters $\delta_\theta$, $\phi_h$, $\Psi$ and $\Re$ in the cascade rule based classification algorithm.

Referring to FIG. 1, the system 150 always starts off by loading up the constant parameter generator 154 with pre-defined exemplary values (as shown in earlier parts of this disclosure for the parameters listed in the previous paragraph) for $\delta_\theta$, $\phi_h$, $\Psi$ and $\Re$. A human operator 168 commands the system to select the constant parameters through the steps of human intervention 162 and parameter selection 158. A feedback 164 from the classification system 160 provides useful information to the human intervention step 162 (e.g., by displaying of an intermediate result) for seeking either staying on the current course or calling for a change of the operation. If the latter is true, the human operator can halt the operation through human intervention 162 and adjust corresponding parameters $\delta_\theta$, $\phi_h$, $\Psi$ and $\Re$ (this action is represented by the step of using the controllable parameter generator 152). Then the human operator 168 commands the system to select the controllable parameters through the steps of human intervention 152 and parameter selection 158.

The system configuration/reconfiguration also includes the selection of different workflows that are shown in FIGS. 2(A) and (B) and FIGS. 3(A) and 3(B).

Presented in the present invention are a method and a system of configurable microcalcification detection for mammography CAD. The system parameters are from a plurality of different parameter generating sources, at least one of which is controllable by human input.

Figure 5:
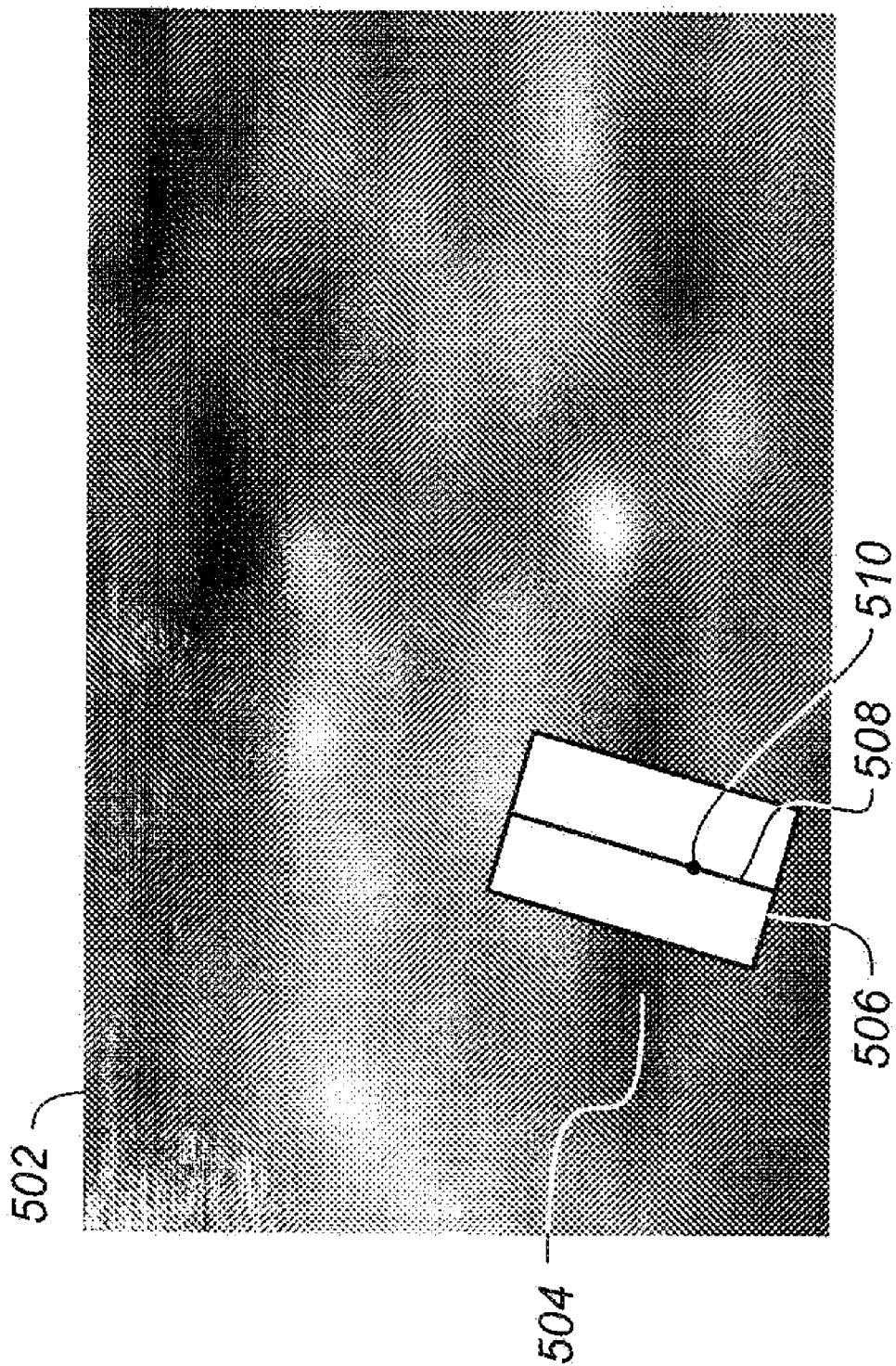
FIG. 5 is a graph illustrating a design to compute an eigenvalue band integral profile for an object in a digitized mammogram according to an embodiment of the current invention.

Noted that, in general, algorithms such as the one in the present invention do not distinguish concave and convex objects in images. Also noted that the line structures to be verified in mammograms (images) appear, usually, brighter than other background contents. An exemplary ROI 502 is shown in FIG. 5 where object 504, which is not a type of line structure presently sought. To rule out this type of false line structure, constructed in the present invention is a method of classifying convexity and concavity of detected linear structures. A preferred scheme for classifying convexity and concavity of verified linear structures is an eigenvalue band integral profiling in the present invention.

Figure 6:
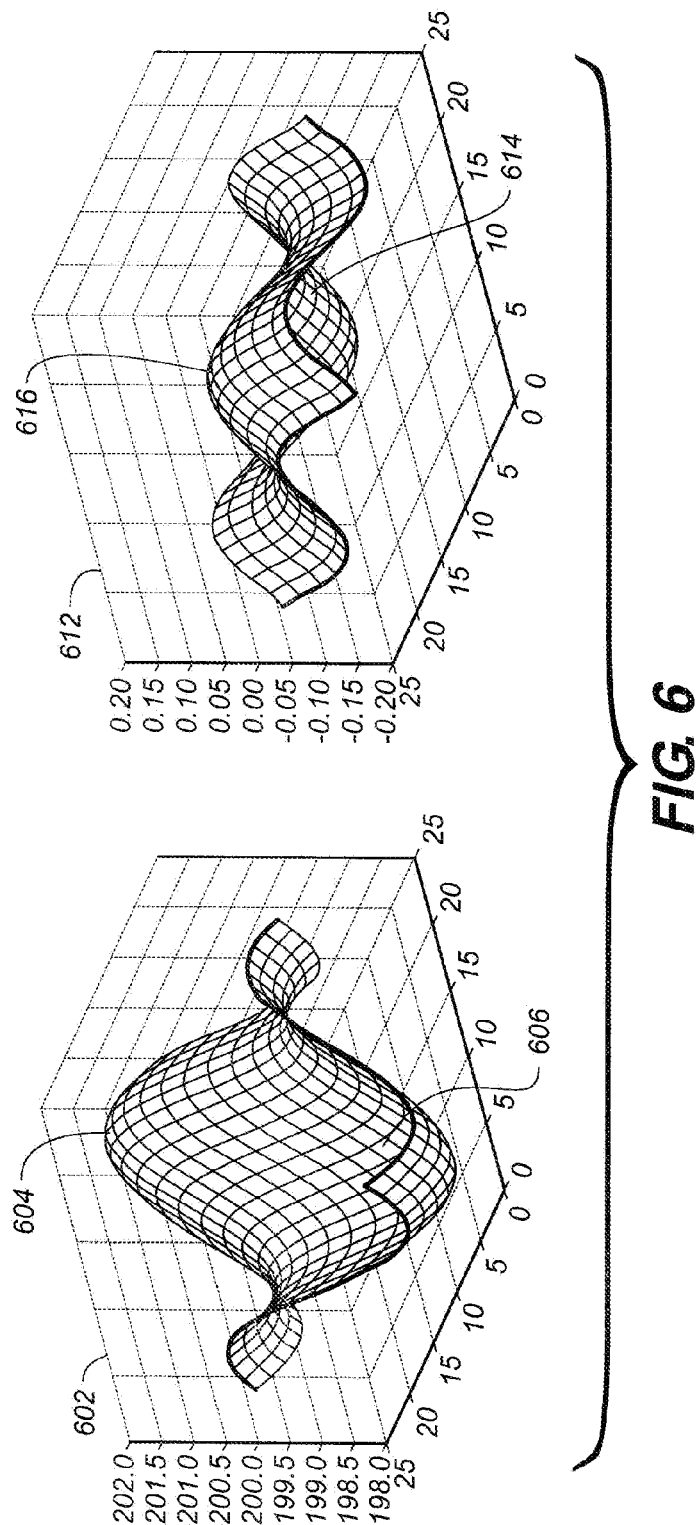
FIG. 6 is an illustration of an image that has a convex surface and a concave surface parts and an image of corresponding eigenvalues.

Graph 602 in FIG. 6 shows a convex surface 604 and a concave surface 606 illustrating intensity profiles for an arbitrarily image. Graph 612 shows the corresponding eigenvalue profiles of graph 602. Noted that a convex surface 604 has negative eigenvalues 614 and the concave surface 606 has positive eigenvalues 616. The steps of computing eigenvalues of a surface are described below.

Denote ROI 502 by image I. Define a band 506 that covers part of the object (surface) 504. Denote a band line 508 in band 506 by $l_k$. Denote the position of a pixel 510 on line 508 within band 506 by $p_{l_k,i}$. Denote the code value (intensity) of pixel 510 by $I(p_{l_k,i})$. Construct a Hessian matrix $H=\{h_{m,n}\}$ for each of the pixels within the band 506 with the formula $$H(I(p_{l_k,i})) = \{h_{m,n}\}; \quad h_{m,n} = \frac{\partial I}{\partial x_m \partial x_n};$$

Figure 7:
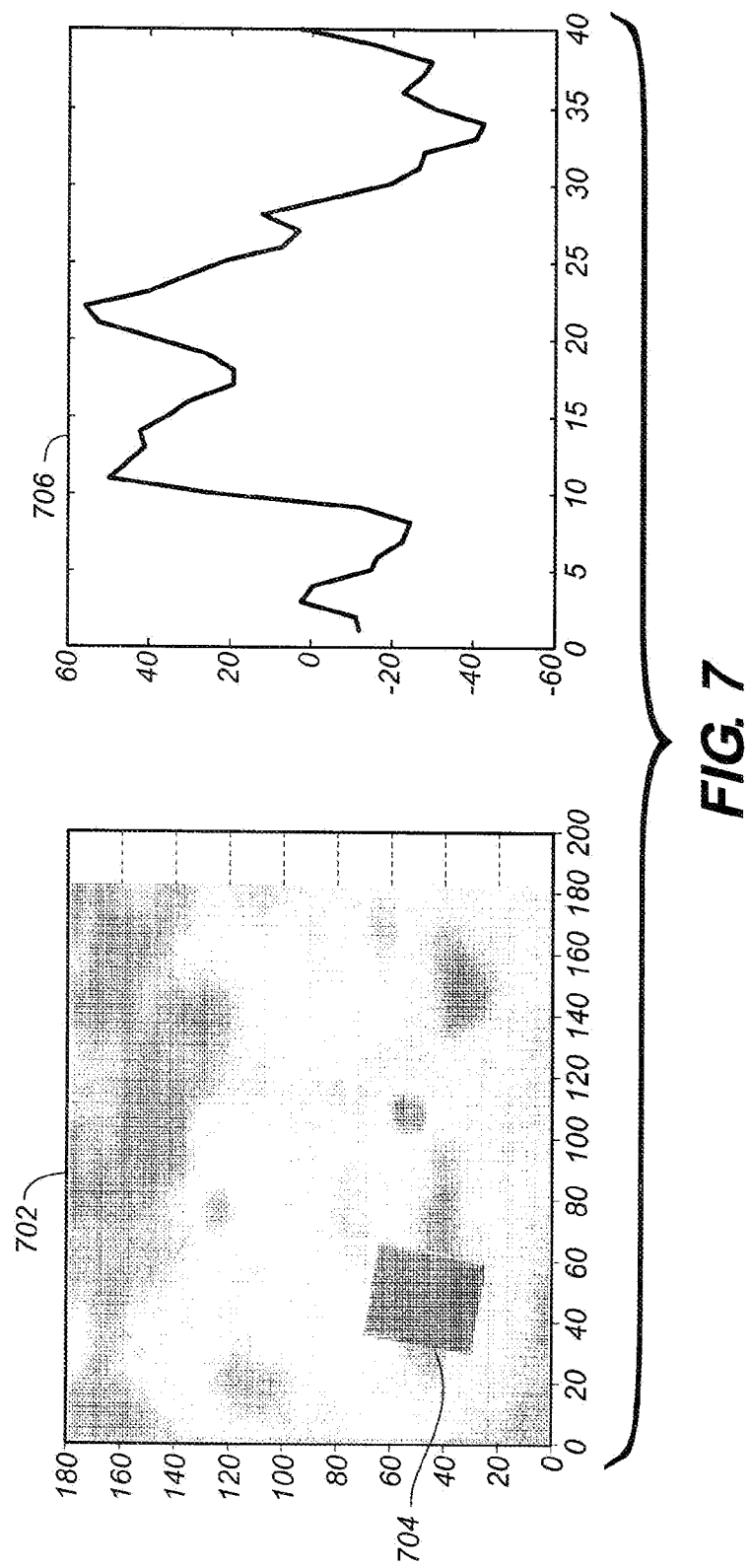
FIG. 7 is an illustration of an exemplary band that covers an object in a region of interest in a digitized mammogram and the corresponding actual eigenvalue band integral profile.

$m \in [1,2]$; $n \in [1,2]$. Where $x_m$ and $x_n$ signify two orthogonal axes of image I, and element $h_{m,n}$ is a partial derivative. Solve the following matrix equation to obtain eigenvalues $\lambda_1$ and $\lambda_2$ for every pixel $P_{l_k,i}$ within band 506:

$$H = E \Lambda E^{-1}; \quad E = [e_1, e_2]; \quad \Lambda = \begin{bmatrix} \lambda_1 & 0 \\ 0 & \lambda_2 \end{bmatrix},$$

where $e_1$ and $e_2$ are 2 by 1 column vectors (Eigen vectors). The sign of the eigenvalues indicates the surface orientation, either concave or convex. In the present invention, to evaluate the surface orientation, a metric, S, is defined as eigenvalue band integral profile to verify object surface property (convexity and concavity). The element of the eigenvalue band integral profile, S, is computed as $$s_i = \sum_{k=1}^{W} \tilde{I}(p_{l_k,i})$$

where $\tilde{I} = \{\lambda_1(p_{l_k,i}) + \lambda_2(p_{l_k,i})\}$ and W is the number of lines within the band. FIG. 7 shows an actual ROI 702 of a digitized mammogram. A band (704) covers part of an object in ROI 702. Graph 706 on the right displays the actual eigenvalue band integral profile for the pixels within band 704. The positive curve of the eigenvalue band integral profile indicates that the object covered by band 704 in ROI 702 has concave type surface in terms of its intensity values.

Those skilled in the art should understand that metrics other than eigenvalue band integral profile that is devised in the present invention, such as, intensity profiles, could be employed for the purpose of classifying image object surface convexity and concavity.

The present invention is described as a method. However, in another preferred embodiment, the present invention comprises a computer program product for microcalcification detection in mammography CAD in accordance with the method described.

The CAD system could include a computer as discussed above along with a display for displaying the results of the detection. In describing the present invention, it should be also apparent that the computer program of the present invention can be utilized by any well-known computer system, such as the personal computer. However, many other types of computer systems can be used to execute the computer program of the present invention. Consequently, the computer system will not be discussed in further detail herein.

It will be understood that the computer program product of the present invention may make use of image manipulation algorithms and processes that are well known. Accordingly, the present description will be directed in particular to those algorithms and processes forming part of, or cooperating more directly with, the method of the present invention. Thus, it will be understood that the computer program product embodiment of the present invention may embody algorithms and processes not specifically shown or described herein that are useful for implementation. Such algorithms and processes are conventional and within the ordinary skill in such arts.

Additional aspects of such algorithms and systems, and hardware and/or software for producing and otherwise processing the images or co-operating with the computer program product of the present invention, are not specifically shown or described herein and may be selected from such algorithms, systems, hardware, components and elements known in the art.

The computer program for performing the method of the present invention may be stored in a computer readable storage medium. This medium may comprise, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program. The computer program for performing the method of the present invention may also be stored on computer readable storage medium that is connected to the image processor by way of the internet or other communication medium. Those skilled in the art will readily recognize that the equivalent of such a computer program product may also be constructed in hardware. The program may also be transmitted over a transmission medium It will be appreciated that variations and modifications can be effected by a person of ordinary skill in the art without departing from the scope of the invention.

The subject matter of the present invention relates to digital image processing and computer vision technologies, which is understood to mean technologies that digitally process a digital image to recognize and thereby assign useful meaning to human understandable objects, attributes or conditions, and then to utilize the results obtained in the further processing of the digital image.

The invention has been described in detail with particular reference to presently preferred embodiments, but it will be understood that variations and modifications can be effected within the scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

| PARTS LIST | |
|---|---|
| 150 | workflow |
| 152 | step |
| 154 | step |
| 156 | mammographic test images |
| 158 | step |
| 160 | step |
| 162 | step |

-continued

| PARTS LIST | |
|---|---|
| 164 | step |
| 168 | human operator |
| 174 | path |
| 176 | path |
| 180 | step |
| 182 | cancerous mammographic images |
| 184 | normal mammographic images |
| 254 | algorithm step |
| 256 | algorithm step |
| 257 | algorithm step |
| 258 | algorithm step |
| 260 | algorithm step |
| 352 | algorithm step |
| 357 | algorithm step |
| 360 | algorithm step |
| 402 | mammogram |
| 404 | region of interest |
| 502 | graph (region of interest) |
| 504 | object |
| 506 | a band |
| 508 | a band line |
| 510 | a band pixel |
| 602 | graph (surfaces) |
| 604 | convex surface |
| 606 | concave surface |
| 612 | graph (eigenvalues) |
| 614 | negative eigenvalues |
| 616 | positive eigenvalues |
| 702 | graph (region of interest) |
| 704 | a band |
| 706 | eigenvalue band integral profile |
| 801 | a mammograpic image |
| 802 | a boundary |
| 804 | clusters |
| 806 | a breast |
| 810 | a mammographic image |
| 812 | a boundary |
| 814 | clusters |
| 816 | a breast |
| 902 | region of interest |
| 904 | region of interest |
| 1002 | a graph of a band and a linear structure |
| 1004 | a graph of a band and a linear structure |
| 1102 | a region of interest |
| 1104 | a graph |
| 1202 | a region of interest with a band |
| 1302 | a graph |
| 1304 | a graph |
| 1402 | a graph |
| 1502 | a graph |
| 1504 | a graph |
| 1506 | a graph |
| 1508 | a graph |
| 1602 | a graph |

The invention claimed is:

1. A method of microcalcification detection in mammographic images, comprising:
    forming a plurality of true microcalcification (mcc) clusters from a plurality of cancerous mammographic images that pass a mcc ground truth measure test;
    forming a plurality of normal clusters from a plurality of normal mammographic images;
    gathering spot and cluster features from said true mcc clusters and normal clusters;
    extracting linear structure features in said cancerous mammographic images and normal mammographic images guided by said true mcc clusters and said normal clusters;
    using said gathered spot and cluster features and said extracted linear structure features in mcc detector training; and
    applying said mcc detector to mammographic test images which are under testing for cancerous lesions.

2. A method as in claim 1, wherein said mcc ground truth measure test determines the degree of importance or involvement of a cancerous mammographic image or a true mcc cluster in mcc detection training.

3. A method as in claim 1, wherein said extracting linear structure features comprises:
    extracting rotateable bands in said cancerous mammographic images and normal mammographic images; and
    processing said rotateable bands to generate linear structure features.

4. A method as in claim 1, wherein said forming of true clusters comprises:
    performing a cluster ground truth region test; and
    randomly removing clusters within the region according to the test results.

5. A method as in claim 4, wherein the test comprises comparing the number of clusters within the region to a threshold and randomly removing some of the clusters if the number of cluster is above the threshold.

6. A method as in claim 4, wherein the test comprises comparing a size of a ground truth region to a size of the object of the image.

7. A method as in claim 3, wherein the processing comprises determining an ensemble average curve ratio and a maximum relative magnitude of ensemble average curves to identify a linear structure feature.

8. A method as in claim 3, wherein the processing comprises determining whether lines of the bands form a peak in Hough parameter space and determining the angle spread of the lines of the bands in Hough parameter space.

9. A method of microcalcification detection with cluster reduction in mammographic images, comprising:
    forming a plurality of true microcalcification (mcc) clusters from a plurality of cancerous mammographic images that pass a mcc ground truth measure test;
    forming a plurality of normal clusters from a plurality of normal mammographic images;
    gathering spot and cluster features from said true mcc clusters and normal clusters;
    extracting linear structure features in said cancerous mammographic images and normal mammographic images guided by said true mcc clusters and said normal clusters;
    generating cluster reduction rules from distributions of said linear structure features;
    using said spot and cluster features, said linear structure features and said cluster reduction rules in mcc detector training; and
    applying said mcc detector and said cluster reduction rules to mammographic test images which are under testing for cancerous lesions.

10. A method as in claim 9, wherein cluster reduction rules are cascade rules that confirm an association of a cluster with linear structures.

11. A method as in claim 9, wherein using said cluster reduction rules in mcc detector training removes a certain number of clusters if they are confirmed as being associated with linear structures.

12. A method as in claim 9, wherein applying said cluster reduction rules mammographic to test images removes a certain number of clusters if they are confirmed as being associated with linear structures.

13. A method as recited in claim 9, wherein said generating comprises:
- determining ensemble average curve statistics containing an ensemble average curve ratio and a maximum relative magnitude of ensemble average curves for cluster candidates;
- tagging cluster candidates as linear, non-linear or uncertain responsive to the ensemble average curve statistics;
- applying a Hough transform to an uncertain cluster candidate;
- comparing a Hough spread angle to a spread angle threshold;
- comparing a Hough normalized maximum magnitude to a normalized maximum magnitude threshold;
- tagging uncertain clusters as linear or non-linear responsive to the comparisons; and
- changing a cluster tagged as linear to non-linear when a ring hit threshold is exceeded.

14. A method of microcalcification detection incorporating linear structure features in mammographic images, comprising:
- forming a plurality of true microcalcification (mcc) clusters from a plurality of cancerous mammographic images;
- forming a plurality of normal clusters from a plurality of normal mammographic images;
- gathering spot and cluster features from said true mcc clusters and normal clusters;
- extracting linear structure features in said cancerous mammographic images and normal mammographic images guided by said true mcc clusters and said normal clusters;
- using said gathered spot and cluster features and said extracted linear structure features in mcc detector training; and
- applying said mcc detector to mammographic test images which are under testing for cancerous lesions.

15. An apparatus, comprising:
- a display for displaying a result; and
- a computer detecting microcalcifications (mcc) incorporating linear structure features in mammographic images by inputting a plurality of true mcc clusters and a plurality of normal clusters, gathering spot and cluster features from said clusters, extracting linear structure features, using said spot, cluster and linear structure features in mcc detector algorithm training, and applying said mcc detector algorithm to mammographic test images which are under testing for cancerous lesions to produce the result.

16. A computer readable storage for controlling a computer storing a program for detecting microcalcifications (mcc) incorporating linear structure features in mammographic images by inputting a plurality of true mcc clusters and a plurality of normal clusters, gathering spot and cluster features from said clusters, extracting linear structure features, using said spot, cluster and linear structure features in mcc detector algorithm training, and applying said mcc detector algorithm to mammographic test images which are under testing for cancerous lesions to produce the result.

17. A computer system configured for microcalcifications (mcc) detecting by forming a plurality of true mcc clusters and a plurality of normal clusters, gathering spot and cluster features from said clusters, extracting linear structure features, and using said spot, cluster and linear structure features in mcc detector algorithm training.

* * * * *